(12) United States Patent
Olsson

(10) Patent No.: US 11,378,044 B2
(45) Date of Patent: Jul. 5, 2022

(54) WATER SEPARATING ARRANGEMENT IN A VEHICLE AIR INTAKE

(71) Applicant: Volvo Bus Corporation, Gothenburg (SE)

(72) Inventor: Mona Olsson, Säve (SE)

(73) Assignee: Volvo Bus Corporation, Gothenburg (SE)

( * ) Notice: Subject to any disclaimer, the term of this patent is extended or adjusted under 35 U.S.C. 154(b) by 37 days.

(21) Appl. No.: 17/059,580

(22) PCT Filed: Jun. 12, 2018

(86) PCT No.: PCT/EP2018/065452
§ 371 (c)(1),
(2) Date: Nov. 30, 2020

(87) PCT Pub. No.: WO2019/238217
PCT Pub. Date: Dec. 19, 2019

(65) Prior Publication Data
US 2021/0207562 A1    Jul. 8, 2021

(51) Int. Cl.
*F02M 35/08* (2006.01)
*F02M 35/022* (2006.01)
(Continued)

(52) U.S. Cl.
CPC .......... *F02M 35/088* (2013.01); *B01D 45/08* (2013.01); *F02M 35/0223* (2013.01); *F02M 35/10262* (2013.01)

(58) Field of Classification Search
CPC ............. F02M 35/088; F02M 35/0223; F02M 35/10262; F02M 35/02483; B01D 45/08; B01D 46/00
See application file for complete search history.

(56) References Cited

U.S. PATENT DOCUMENTS 5,794,733 A    8/1998  Stosel et al.
5,928,043 A    7/1999  Rinzaki
(Continued)

FOREIGN PATENT DOCUMENTS

CN    202360255 U    8/2012
CN    103452711 A    12/2013
(Continued)

OTHER PUBLICATIONS

International Search Report and Written Opinion for PCT/EP2018/065452, dated Aug. 20, 2018, 10 pages.
(Continued)

*Primary Examiner* — Syed O Hasan
(74) *Attorney, Agent, or Firm* — Withrow & Terranova, PLLC

(57) ABSTRACT

The invention relates to a water separating arrangement in a vehicle air intake intended for mounting between a source of ambient air and an air filter unit. The water separating arrangement (101; 201; 301) comprises a first water separator (110; 210; 310) having a horizontal air intake section (212; 312) and a first water separating section (211; 311), which first water separating section is arranged at least partially surrounding an outer portion of the air intake section (212; 312). The water separating arrangement (101; 201; 301) further comprises a second water separator (120; 220; 320) comprising a housing (221; 321) with an air inlet (223; 323) connected to the air intake section (212; 312); an air outlet (224; 324) connected to an air outlet section (229; 329); wherein the second water separator is arranged to redirect the flow of ambient air over an angle of at least 80°.

14 Claims, 12 Drawing Sheets

(51) Int. Cl.
*F02M 35/10* (2006.01)
*B01D 45/08* (2006.01)

(56) References Cited

U.S. PATENT DOCUMENTS

| | | | |
|---|---|---|---|
| 6,312,488 B1 * | 11/2001 | Fischer | F02M 35/088 55/315 |
| 2004/0031247 A1 | 2/2004 | Darnell | |
| 2013/0160649 A1 * | 6/2013 | Spryshak | B01D 45/08 55/423 |
| 2013/0247859 A1 | 9/2013 | Cremer et al. | |
| 2018/0147514 A1 * | 5/2018 | Harke | B60H 1/039 |

FOREIGN PATENT DOCUMENTS

| | | | | |
|---|---|---|---|---|
| CN | 104612863 A | 5/2015 | | |
| CN | 107806383 A | 3/2018 | | |
| EP | 0965378 A1 | 12/1999 | | |
| EP | 3059434 A1 | 8/2016 | | |
| FR | 2857058 A1 | 1/2005 | | |
| FR | 2936571 | * 10/2010 | | B01D 46/0031 |
| JP | 2003013816 A | 1/2003 | | |

OTHER PUBLICATIONS

International Preliminary Report on Patentability for PCT/EP2018/065452, dated Jul. 2, 2020, 16 pages.
First Office Action for Chinese Patent Application No. 201880094263.X, dated Feb. 7, 2022, 10 pages.

* cited by examiner

WATER SEPARATING ARRANGEMENT IN A VEHICLE AIR INTAKE

This application is a 35 USC 371 national phase filing of International Application No. PCT/EP2018/065452, filed Jun. 12, 2018, the disclosure of which is incorporated herein by reference in its entirety.

TECHNICAL FIELD

The invention relates to a water separating arrangement in a vehicle air intake, which water separating arrangement comprises a first and a second water separating section.

The invention relates to a water separating arrangement in a vehicle air intake, which water separating arrangement comprises a first and a second water separating section.

The invention can be applied in heavy-duty vehicles, such as trucks, articulated trucks, buses and construction equipment, which vehicles may be manned or unmanned. Although the invention will be described with respect to a heavy-duty vehicle, the invention is not restricted to this particular vehicle, but may also be used in other vehicles such as articulated haulers, wheel loaders, and other working machines.

BACKGROUND

Vehicles in general are as a rule provided with air intake arrangements for ambient air, which air can be used as combustion or ventilation air. The quality of the air can be dependent on current weather conditions, in particular on water droplet content during wet and windy conditions. It is desirable to eliminate water droplets in the air intake, to avoid entrained water from reaching air filters provided for the engine and/or ventilation. Water droplets in intake air can disturb or even damage air flow sensors and can also damage filter cartridges in air intake conduits.

Current solutions are often based on intake boxes having large volumes in order to decrease the air velocity, allowing water/dust to separate from the air flow due to gravity. This can be achieved by reducing the air speed below 4 m/s, which would allow water droplets to fall out of the airstream. However, large volume boxes require large installation space which can be hard to achieve in many installations. In addition, the box surfaces are often large and flat which can cause resonance noise in the vehicle interior. It is also known to use fixed propellers or fins placed in the intake conduits. Such solutions will cause pressure losses, which is detrimental to the flow of air through intake conduits in which, depending on the configuration of the air intake, the air velocity can at times reach 30-40 m/s. Furthermore, the addition of helices or fins complicates the structure and manufacture of the intake conduits and increases the cost.

FR2857058A discloses a solution for eliminating water droplets in the air intake conduits of an internal combustion engine. This arrangement comprises an air inlet pipe having a bend towards a downstream end where a water recuperation hole is provided. The hole traverses a wall of the air inlet pipe. An annular shoulder is arranged at the interior of the wall, towards the downstream end. The hole is pierced at a lower point of the shoulder. The hole communicates with a resonator that forms a water sedimentation casing. A disadvantage of this solution is that it is not suitable for handling a sudden influx of water, which would simply flow over the shoulder and into the air intake. Further, it is not suitable for handling water droplets/spray entrained in the air flow that bypasses the shoulder.

Hence it is desirable to provide an improved water separating arrangement for removing water and spray from intake air in order to overcome the above problems.

SUMMARY

An object of the invention is to provide a water separating arrangement, which water separating arrangement is described in the appended claims.

Relative directions referred to in the text, such as "horizontal", "vertical", "inlet", "outlet", "upstream" and "downstream", are used to indicate the location and relative positioning of component parts when the water separating arrangement is arranged in its operative position.

According to a first aspect of the invention, the object is achieved by a water separating arrangement in a vehicle engine air intake mounted between a source of air and an engine air filter unit. The water separating arrangement is intended for mounting between a source of ambient air and an engine air filter unit, wherein ambient air is drawn through an inlet into an air supply conduit into the water separating arrangement. The inlet can be an opening in the vehicle body, such as a grille or a similar device, or an air intake unit extending out of the vehicle body. The opening can be protected by a water deflecting device such as a grille, a mesh or other suitable means to prevent ingress of water directly into the air supply conduit. Such devices are commonly used in vehicles and are not part of the invention as such. The air supply conduit can be a flexible hose or a similar suitable conduit that can be connected to the water separating arrangement using a suitable clamping means, such as a hose clamp or a similar connecting device. A suitable flexible conduit can, for example, be a PVC or CR hose reinforced with a spring steel wire helix. Alternative air supply conduits can comprise a tubular component with one or more resilient connecting devices to allow relative movement between at least the air supply conduit and the water separating arrangement.

The water separating arrangement according to the invention comprises an air intake section, which air intake section is arranged to receive a flow of air. A first water separating section is arranged to surround at least the lower half of a closed circumference of an outer portion of the air intake section. The first water separating section can be arranged to surround up to and including the entire closed circumference of the outer portion of the air intake section. The air intake section has a free outer portion that is arranged to extend a predetermined distance upstream and has a smaller cross-section than the surrounding first water separating section. The cross-sectional shapes of the air intake section and the first water separating section are preferably the same, e.g. tubular, or at least similar in the overlapping region. If tubular sections are used, then the relative diameters of the free outer portion of the air intake section and the first water separating section are selected so that water flowing along the walls of the air supply conduit into the first water separator can flow into the first water separating section without contacting or flowing into the free outer portion of the air intake section. The first water separating section can in turn be connected to the air intake section downstream of the free outer portion. This creates an annular or part annular space for collecting water that has left the flow of air and settled on the internal wall of the supply conduit before reaching the first water separating section. The water collecting portion is arranged in a lower part of the annular or part annular space separating the free outer portion of the air intake section and the surrounding first water separating section. The first water separating section is in turn connected to the supply conduit supplying ambient air from the inlet. This connection can be permanent or detachable but should prevent water from leaking past the connection. The space for collecting water is connected to a draining means leading collected water away from the first water separating section. The draining means can be arranged in the first water separating section in the vicinity of and below the free outer portion of the air intake section.

In this way, the first water separating section can remove a substantial amount of the water reaching the water separating arrangement, in particular water drawn by the flow of ambient air towards the water separating arrangement along the inner wall of the air supply conduit. However, water in the form of spray or mist carried by the flow of ambient air itself will bypass the first water separating section and reach the housing. In order to remove water spray carried by the air flow, a second water separating section is provided.

The water separating arrangement also comprises an air outlet section, which air outlet section is arranged separated from the air intake section to supply air to the air filter unit. A second water separating section located between the air intake section and the air outlet section, which second water separating section comprises a housing. The housing comprises a first wall section with an air inlet connected to the air intake section and which air inlet is arranged to direct the air flow into the housing along a first axis. The first axis is preferably arranged to coincide with the central axis of the air inlet at the point of entry into the housing. The point of entry is defined as the position where the first central axis intersects the first wall section. The housing further comprises a second wall section with an air outlet connected to the air outlet section and which air outlet is arranged to direct the air flow out of the housing along a second axis. The second axis is preferably arranged to coincide with the central axis of air outlet at the point of exit out of the housing. The point of exit is defined as the position where the second central axis intersects the second wall section. The first wall section and the second wall section are joined along a straight line, which line is preferably arranged at right angles to a plane coinciding with the first and second axes. The first axis and the second axis can be located angled relative to each other to re-direct the air flow direction between the air inlet and the air outlet over an angle of at least 80°. This angle is measured in a plane coinciding with and containing both the first and second axes. The re-direction of the air flow direction allows the second water separating section to use the centrifugal force to remove water droplets from the air flow. Due to the differences in density and momentum between the flowing air and the water contained therein, water spray carried by the flow of ambient air will impinge on and adhere to the internal walls of the housing and gravitate towards a draining means in a lower portion of the housing. The combined effect of the first and second water separating sections allows for more than 80-90% of the water to be removed.

According to a further example, the water separating arrangement comprises a first axis and a second axis located angled relative to each other to re-direct the air flow direction between the air inlet and the air outlet over an angle up to and including 200°. The invention may be operable outside the range of 80° to 200°, but lower angles will increase the amount of water retained in the air stream and high angles will cause an undesirable increase in flow resistance.

According to a further example, the re-direction of the air flow direction between the air inlet and the air outlet can be achieved by arranging the first wall section at an angle relative to the second wall section, which angle is selected in the range from 80° to 200°. The angle is measured between planes coinciding with internal surfaces of the first wall section and the second wall section, about the line of intersection of the planes. The line of intersection is the line which is perpendicular to the normal of both the given planes, which in this case is the line joining the first wall section and the second wall section According to one example, each of the first axis and the second axis are located at right angles to a plane coinciding with their respective first wall section and second wall section. Alternatively, one or both of the first axis and the second axis are located at an angle to a plane coinciding with their respective first wall section and second wall section. This angle is measured between the first axis or the second axis and a normal to a plane coinciding with their respective first wall section and second wall section, in a plane coinciding with both the first axis and the second axis.

Consequently, it is possible to re-direct the air flow direction between the air inlet and the air outlet over the above-mentioned range of 80° to 200° by selecting a desired angle between the first and second wall sections, by selecting a desired angle for the first and/or second axes relative to their respective wall sections, or by a combination of the above.

According to a further example, the air inlet and the air outlet are connected to the housing at vertically separated locations. According to one example, the air inlet is connected to the housing at a location above the air outlet. The opposite arrangement is also possible, wherein the air outlet is connected to the housing at a location above the air inlet. Alternatively, the air outlet and the air inlet are connected to the housing at the same horizontal level.

According to the invention, the housing further comprises a curved wall section facing the air inlet and the air outlet and connecting opposite ends of the first wall section and the second wall section. The opposite ends of the first wall section and the second wall section are located remote from the line joining the first wall section and the second wall section. A cross-section of the curved wall section, taken in a plane at right angles to the first and second wall sections, can have a part-circular shape, a D-shape, have the shape of a partial Fibonacci spiral, or a similar suitable curved shape. The housing also comprises a pair of facing side wall sections connecting the first wall section, the second wall section and the curved wall section. The facing side wall sections can be parallel or angled relative to each other, e.g., converging or diverging in the general direction of the first and second wall sections. The width of the housing can be measured at right angles to a plane containing the first and the second axes, between the inner walls of the side wall sections. The minimum distance between the side wall sections adjacent the air inlet is at least equal to the inner diameter of the air inlet. This arrangement reduces the pressure losses at the entrance to the housing, which is detrimental to the flow of air through intake conduits. The minimum distance between the side wall sections adjacent the air outlet is preferably greater than the inner diameter of the air outlet. This minimum distance can be at least 10%, alternatively up to 50%, of the inner diameter of the air outlet. This arrangement provides an edge, or barrier, between the side walls and the second wall section in order to prevent water adhering to the side wall sections from being drawn into the air outlet.

The second water separating section has a water collecting portion arranged in a lower part of the housing. The water collecting portion is preferably arranged in the lowermost part of the housing and extends a predetermined vertical distance below the air inlet and/or the air outlet. If the air inlet and the air outlet are vertically separated, then the water collecting portion can be accommodated in the lower part of the curved wall section. If the air inlet and the air outlet are level in a horizontal plane, then the water collecting portion can be accommodated in the lower one of the two side wall sections. This vertical separation is particularly advantageous between the water collecting portion and the air outlet, as it assists in avoiding deposited water from being drawn out of the housing by the flowing intake air.

According to a further example, the cross-sectional area of the air outlet section can be equal to or greater than the cross-sectional area of the air inlet section. After passing through the first and second water separating sections, the air flow leaves the housing through the lower air outlet and the air outlet section. The cross-sectional area of the lower air outlet can be at least equal to, or greater than the cross-sectional area of the upper air inlet. By selecting a greater cross-sectional area for the lower air outlet, the flow velocity will be marginally lower at the outlet, which can increase turbulence and the chances of water spray and droplets adhering to the housing. An increase in the cross-section of the housing relative to at least the outlet can cause a further reduction of air velocity. For instance, if the air intake section leading into the housing and the air outlet section leaving the housing are circular, then the diameter of the air outlet section would be equal to or greater that the diameter of the air intake section. Further, the edges of the opening of at least the air outlet can be laterally separated from the facing side wall sections. This prevents any water adhering to the walls of the housing from being drawn out through the air outlet.

According to a further example, the air intake section can comprise a curved conduit immediately upstream of the first water separating section. The curved conduit can for instance comprise a conduit section with a 90° bend attached directly to the first water separating section. Depending on the configuration of the air inlet relative to the housing, this arrangement can form an additional part of first water separating stage. At least a portion of the water droplets carried by the intake air can be directed towards a surface along the radially outer internal surface of the curved conduit. Water droplets striking and adhering to the inner surface of the curved conduit allows additional water to be trapped by the first water separating section.

According to a further example, the air outlet section can comprise a curved conduit immediately downstream of the air outlet. The curved conduit can for instance comprise a conduit section with a 90° bend attached directly to the outlet from the second water separating section. Depending on the configuration of the air outlet relative to the housing, this arrangement can form an additional part of the second water separating stage. With the outlet positioned at an upper part of the housing, at least a portion of the remaining water droplets carried by the outlet air can be directed towards a surface along the radially outer internal surface of the curved conduit. Water droplets striking and adhering to the inner surface of the curved conduit can allow additional water to trickle back into and be captured by the second water separating section.

According to a second aspect of the invention, the object of the invention is achieved by a vehicle comprising a water separating arrangement as described above.

Advantages of the current invention are that the water separating arrangement can be made smaller and more compact. This facilitates the fitting of the water separating arrangement into the engine room. The relatively small size allows the water separating arrangement to be located in a position underneath an insulated floor line in a commercial vehicle, such as a bus or a truck. This location minimizes the interior noise level.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings:

FIG. 2B shows a cross-sectional view through the water separating arrangement in

FIG. 2A;

DETAILED DESCRIPTION OF EXAMPLE EMBODIMENTS OF THE INVENTION

Figure 1:
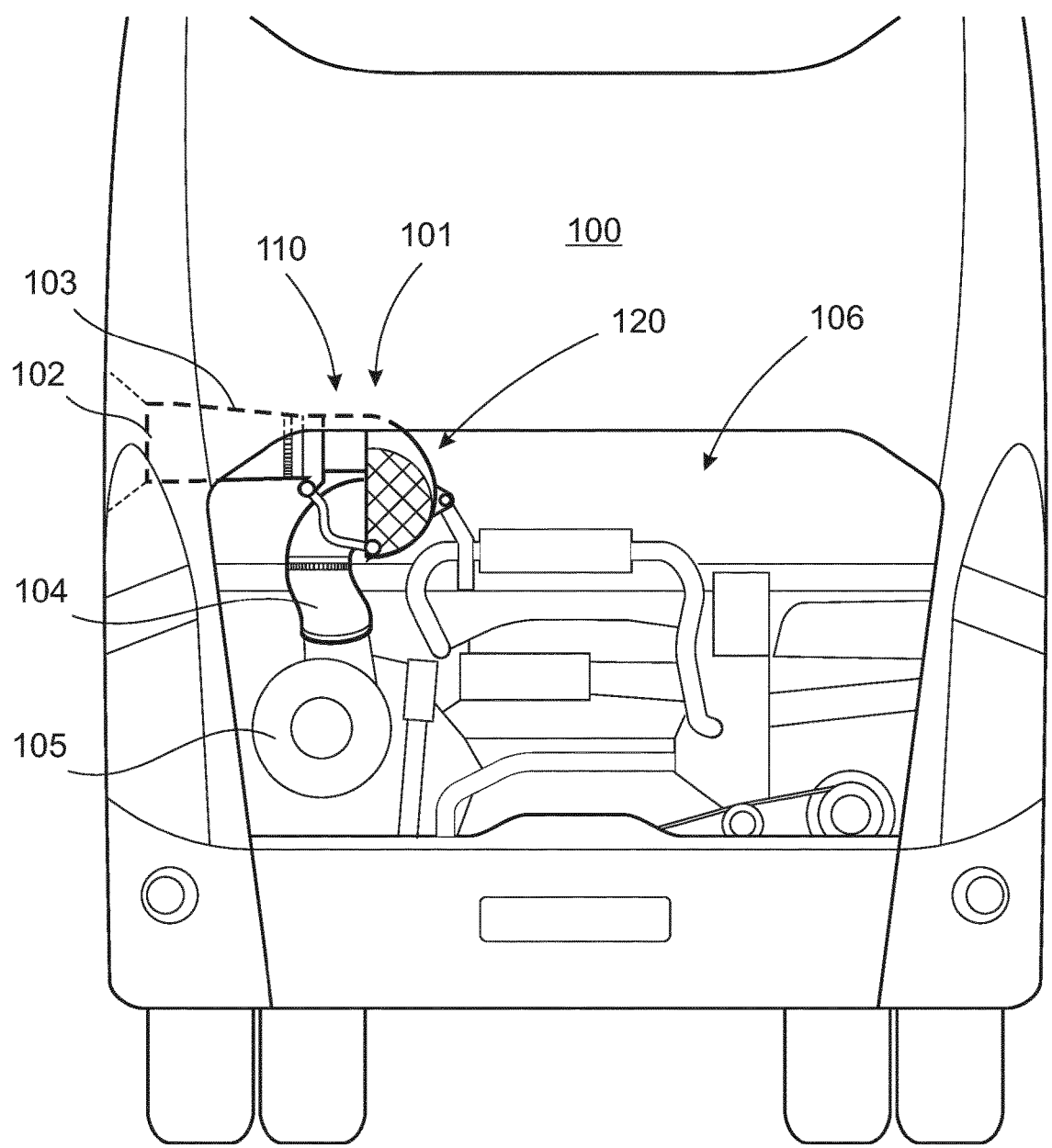
FIG. 1 shows a schematic vehicle provided with a water separating arrangement according to the invention.

FIG. 1 shows a schematic vehicle 100 provided with a water separating arrangement 101 according to the invention. In this example, FIG. 1 shows a rear view of a bus 100 in which the water separating arrangement 101 is mounted. In the example, ambient air is drawn through an inlet 102, in the form of a grille or a similar device, into a first air supply conduit 103. The first air supply conduit 103 can be a flexible hose or a similar suitable conduit that can be connected to the water separating arrangement 101. A suitable flexible conduit can, for example, be a PVC hose reinforced with a spring steel wire helix. A second air supply conduit 104 is provided downstream of the water separating arrangement 101, connecting the water separating arrangement 101 to an air filter unit 105. The air filter unit 105 can supply air to, for instance, an engine 106 or an air conditioning unit (not shown).

The purpose of the water separating arrangement 101 is to remove as much water as possible from the ambient air drawn through the inlet 102. The water reaching the water separating arrangement 101 can be rain water or water spray striking the inlet directly or water running down the chassis past the inlet. The water separating arrangement 101 comprises a first water separator 110 and a second water separator 120, which will be described in further detail below.

Figure 2A:
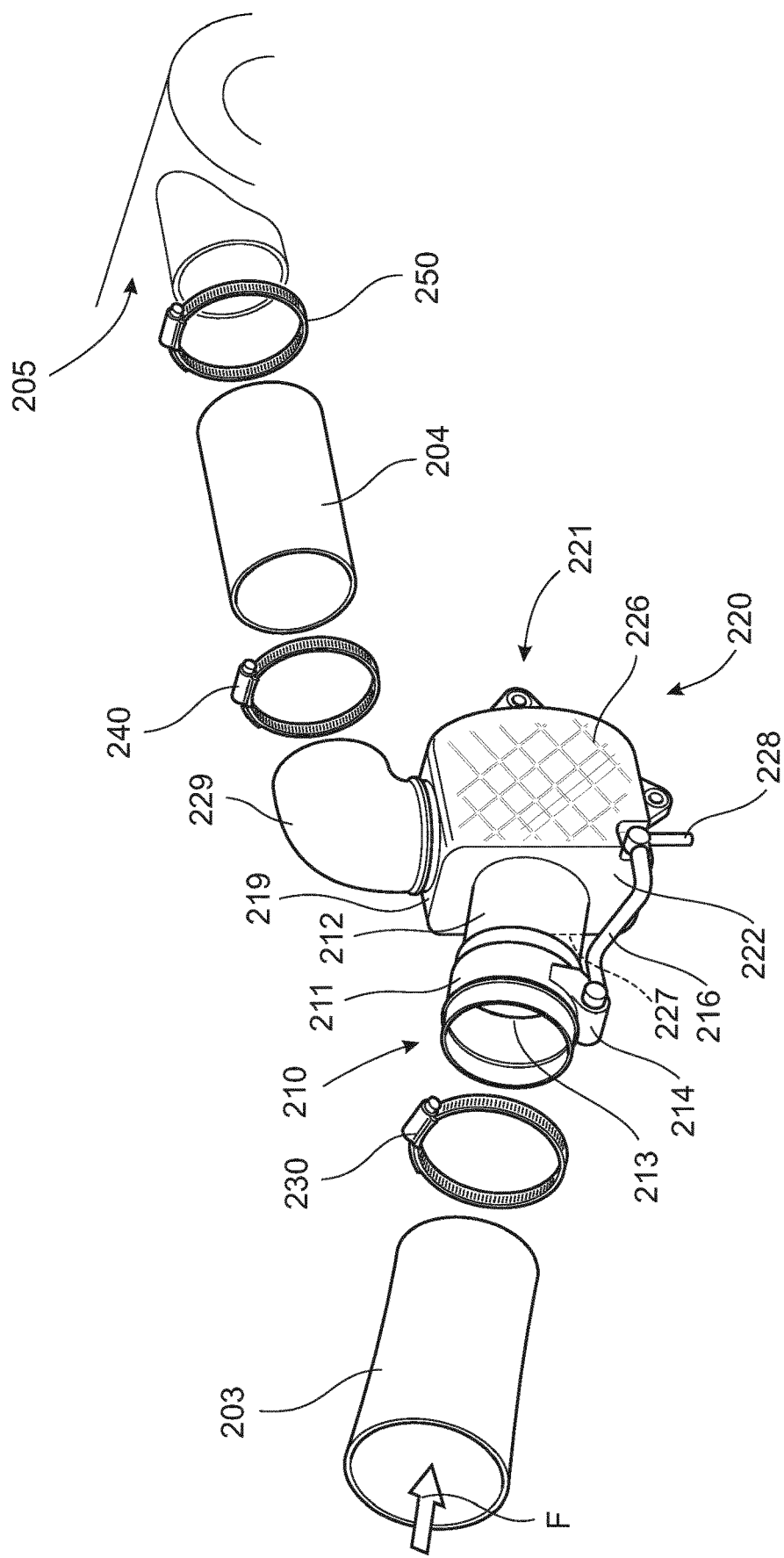
FIG. 2A shows a schematic exploded view of a water separating arrangement according to a first embodiment of the invention.

FIG. 2A shows a schematic exploded view of a water separating arrangement 201 according to a first embodiment of the invention. FIG. 2A shows a water separating arrangement 201, comprising a first water separator 210 and a second water separator 220, for mounting between a source of ambient air and an engine air filter unit in a vehicle, as shown in FIG. 1. The water separating arrangement 201 is connectable to an inlet (see FIG. 1) by a first air supply conduit 203 and to an engine air filter unit 205 by a second air supply conduit 204. The first air supply conduit 203 is connected to a first water separating section 211 of the first water separator 210 using a suitable clamping means 230, such as a hose clamp. Similarly, one end of the second air supply conduit 204 is connected to an air outlet section 229 of the water separating arrangement 201 using one clamping means 240. The other end of the second air supply conduit 204 is connected to the air filter unit 205 using a further clamping means 250.

The first water separator 210 comprises an outer, first water separating section 211 and an inner air intake section 212. The first water separating section 211 is connected to the air intake section 212, which has a free end 213 extending a predetermined distance into the first water separating section 211 in the upstream direction of the air flow F. In this example the first water separating section 211 and the air intake section 212 both comprise concentric tubular components. A first water draining means 214 is provided in the lower portion of the first water separating section 211, which first water draining means 214 is located adjacent and below the free end 213 of the air intake section 212.

The air intake section 212 is joined to a housing 221 that is part of the second water separator 220. The housing 221 comprises a first wall section 222 comprising an air inlet 223 and a second wall section 219 comprising an air outlet 224. In this embodiment, the first wall section 222 and the second wall section 219 are joined along a common, adjoining edge and are arranged at right angles to each other. A curved wall 225, having a corresponding curved internal guide surface (see FIG. 2B) connects the edges of the first wall section 222 and the second wall section 219 remote from the adjoining edge. The housing is delimited by two facing side walls 226, 227 (one visible in FIG. 2A) connecting the respective side edges of the first and second wall sections 222, 219 with the curved wall 225 and its internal guide surface. The air flow F is directed from first air supply conduit 203 through the air intake section 212 and the air inlet 223 into the housing 221. The housing has a substantially D-shaped cross-section in a vertical plane coinciding with the central axis A1 of the air flow through the air intake section 212 and the central axis A2 of the air outlet section 229 where the respective axes A1, A2 join the housing 221. The first axis A1 is preferably arranged to coincide with the central axis of the air inlet 223 at the point of entry into the housing 221. The point of entry is defined as the position where the first central axis A1 intersects the first wall section 222. The second axis A2 is preferably arranged to coincide with the central axis of air outlet 224 at the point of exit out of the housing 221. The point of exit is defined as the position where the second central axis A2 intersects the second wall section 219.

The D-shaped cross-section allows the internal guide surface to redirect a part of the flow of ambient air in excess of 90° from the air inlet 223 towards the air outlet 224. A major part of the airflow will in fact be drawn from the inlet to the outlet without reaching the internal guide surface, causing water droplets to be thrown clear of the air flow as it turns. A second water separating section 228 is arranged in the lower portion of the internal guide surface (see FIG. 2B) of the housing 221 below the air inlet 223. The lower portion of the internal guide surface has a mainly planar cross-section in a vertical plane at right angles to the respective axes A1, A2 of the air flow through the air inlet 223 and the air outlet 224. The second water separating section 228 comprises a transverse channel formed by the lower portion of the internal guide surface and a lower portion (see FIG. 2B; "230") of the first wall section 222. The first wall section 222 extends below the opening of the air inlet 223, allowing water to be collected in the transverse channel. Water is drained through a hose 216 connected to the first water draining means 214 towards the lower portion of the second water separating section 228, from where it is evacuated or drained via a drainage valve (not shown) connected to a drainage hole (not shown) in the lower portion of the second water separating section. The air flow F is directed out of the housing 221 through the air outlet 224 and into the air outlet section 229, which air outlet section 229 is arranged to supply ambient air to the air filter unit 205. In this example the air outlet section 229 comprises a tube section with a 90° bend between a vertical inlet and a horizontal outlet. Alternatively, the air outlet section can comprise a straight section, wherein the air outlet section 229 can be connected directly to the air filter using a flexible hose or similar conduit. The function of the water separating arrangement will be described in connection with FIG. 2B below.

Figure 2B:
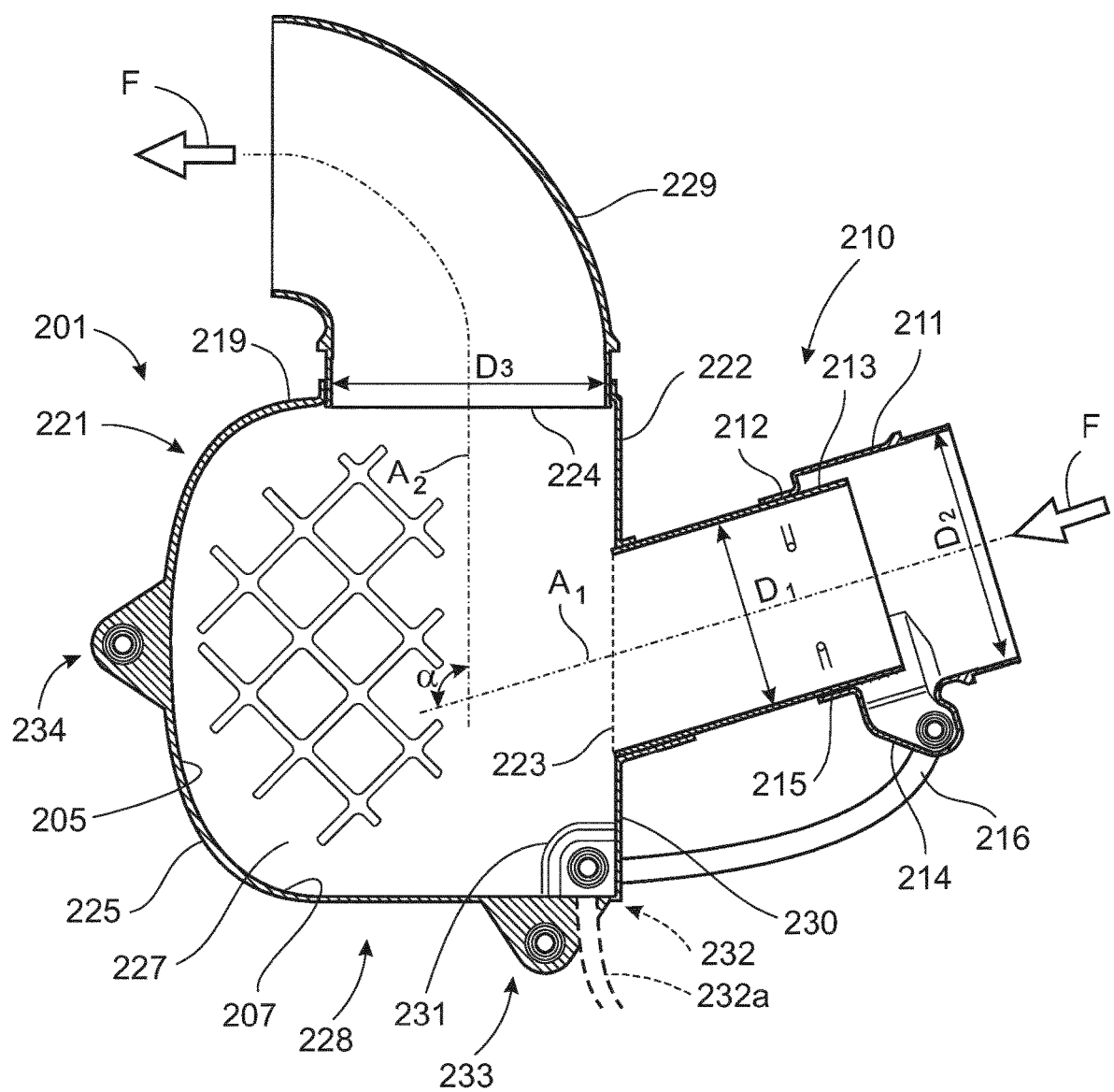

FIG. 2B shows a cross-sectional side view through a water separating arrangement according to the first embodiment of invention. The cross-section is taken in a vertical plane through the arrangement shown in FIG. 2A. As shown in FIG. 2A, a first water separator 210 comprises an outer, first water separating section 211 and an inner air intake section 212. The first water separating section 211 is connected to the air intake section 212, which has a free end 213 extending a predetermined distance into the first water separating section 211 in the upstream direction of the air flow F. In this example, the first water separating section 211 and the air intake section 212 both comprise concentric tubular components. A water draining means 214 is provided in the lower portion of the first water separating section 211, which water draining means 214 is located adjacent and below the free end 213 of the air intake section 212. Water is drained through a hose 216 from the water draining means 214 towards a second water separating section 228, to be described below, to be removed from the water separating arrangement.

The relative diameters D1, D2 of the free outer portions of the air intake section 212 and the first water separating section 211, respectively, are selected so that water flowing along the walls of the air supply conduit (see FIG. 2A; "203") into the first water separator 210 can flow into the first water separating section 211 without contacting or overflowing into the free outer portion 213 of the air intake section 212. The first water separating section 211 is permanently or detachably connected to the air intake section 212 downstream of the free outer portion 213. A connecting joint 215 prevents water from leaking past the connection, so that water reaching the water separating arrangement by following the walls of the air supply conduit will collect in the lower portion of first water separating section 211.

The air intake section 212 is joined to a housing 221 that is part of the second water separator 220. The housing 221 comprises a first wall section 222 comprising an air inlet 223 and a second wall section 219 comprising an air outlet 224. In this embodiment, the first wall section 222 and the second wall section 219 are joined along a common, adjoining edge and are arranged at right angles to each other. A curved wall 225, having a corresponding curved internal guide surface 205, connects the edges of the first wall section 222 and the second wall section 219 remote from the adjoining edge. The housing is delimited by two facing side walls 226, 227 (only "227" visible in FIG. 3) connecting the respective side edges of the first wall section 222 and the second wall section 219 with the curved wall 225 and its internal guide surface 205. The air flow F is directed from first air supply conduit (see FIG. 2A; "203") through the air intake section 212 and the air inlet 223 into the housing 221. The housing has a substantially D-shaped cross-section in a vertical plane coinciding with the central axes A1, A2 of the air flow through the air intake section 212 and the air outlet section 229 where they join the housing 221. The D-shaped cross-section allows the internal guide surface 205 to redirect a part of the flow of ambient air over an angle α of 90° from the upper air inlet 223 towards the lower air outlet 224. A major part of the airflow will in fact be drawn from the inlet to the outlet without reaching the internal guide surface, causing water droplets to be thrown clear of the air flow as it turns. A second water separating section 228 is arranged in at a lower portion 207 of the internal guide surface 205 of the housing 221 below the air inlet 223. The lower portion 207 of the internal guide surface has a mainly planar cross-section in a vertical plane coinciding with the central axes of the air flow through the air intake section 212 and the air outlet section 229 where they join the housing 221. The second water separating section 228 comprises a draining means 231 in the form of a transverse channel or volume formed by the lower portion 207 of the internal guide surface 205 and a lower portion 230 of the first wall section 222. The first wall section 222 extends below the opening of the air inlet 223, allowing water to be collected in the transverse draining means 231. Water can be removed from the water separating arrangement through a drainage hole 232 (indicated in dashed lines), which in this example is located in the lower portion 207 of the internal guide surface 205 of the housing. Alternatively, water can be removed from the water separating arrangement through a drain 232a (shown in dashed lines), which in this example is located in the side wall 226. The air flow F is directed from the housing 221 through the air outlet 224 and into the air outlet section 229, which air outlet section 229 is arranged to supply ambient air to the air filter unit (see FIG. 2A; "205"). In this example the air outlet section 229 comprises a tube section with a 90° bend between a vertical inlet and a horizontal outlet. Alternatively, the air outlet section can comprise a straight section. The air outlet section 229, having a diameter D3 where it leaves the housing 221, can be connected directly to the air filter using a flexible hose or similar conduit. The air outlet section 229 diameter D3 is equal to or greater that the diameter D1 of the air intake section 212. The water separating arrangement 201 is attached to the vehicle at a number of attachment points 233, 234 (two shown).

In operation, the air flow from the inlet will enter the first water separator 210, wherein water flowing along the walls of the air supply conduit into the first water separator 210 can be removed. The air flow from the first water separator 210 will enter the second water separator 220 through the air inlet 223 into the housing 221. Water spray carried by the flow of ambient air will impinge on and adhere to the internal guide surface 205 and, to a certain extent to the facing side walls 226, 227 of the housing 221. Deposited water spray and droplets will flow downwards along the walls of the housing 221 towards the draining means 231. An advantage of this arrangement is that the redirection of the air flow will cause the relatively heavier water droplets carried by the air flow to be thrown outwards by the centrifugal force and impinge on the internal guide surface 205. In this example, the air inlet is positioned below the air outlet, which allows the centrifugal force on the water droplets to be assisted by the gravitational force.

Figure 3A:
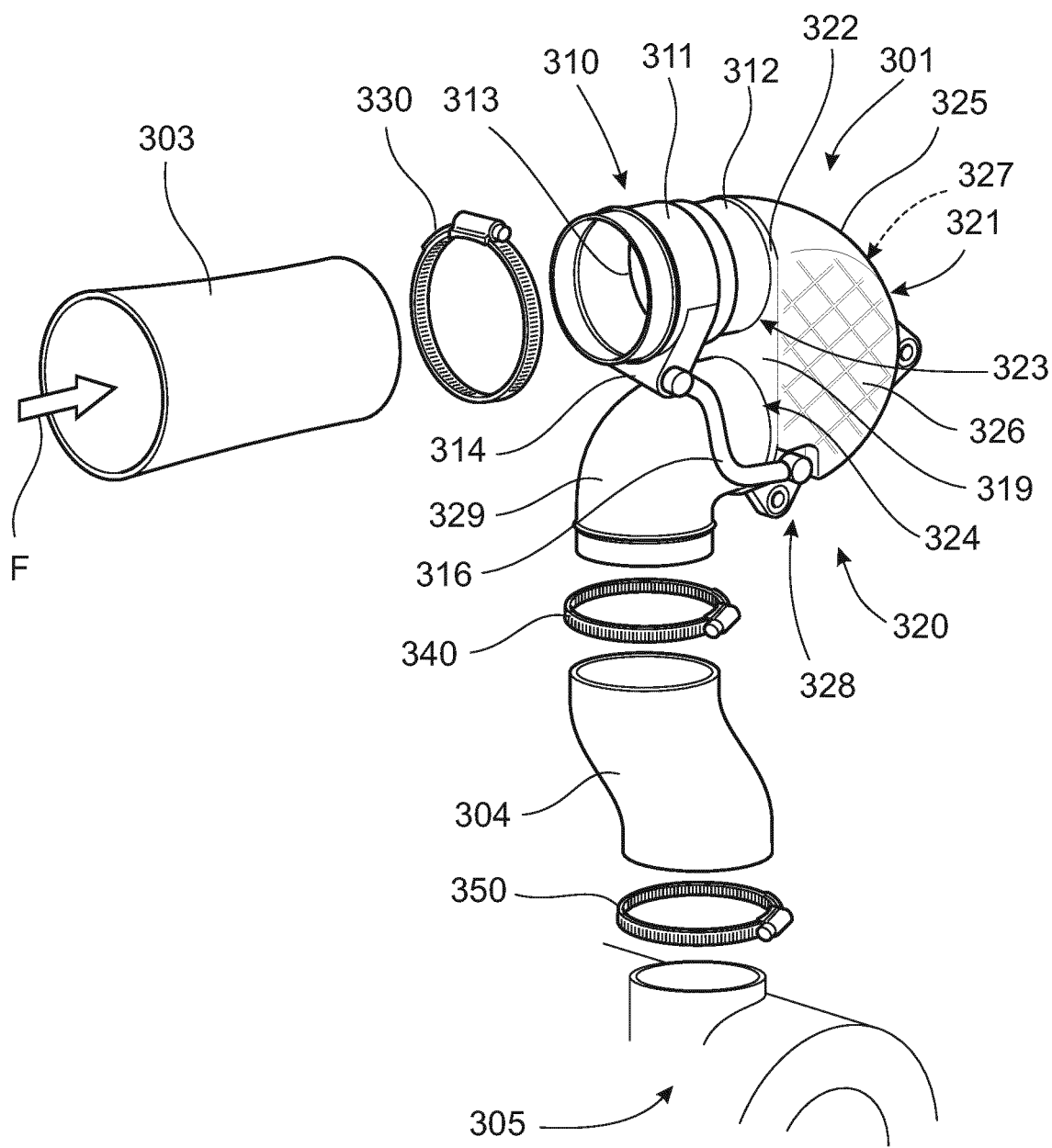
FIG. 3A shows a schematic exploded view of a water separating arrangement according to a second embodiment of the invention.

FIG. 3A shows a schematic exploded view of a water separating arrangement 301 according to a second embodiment of the invention. FIG. 3A shows a water separating arrangement 301, comprising a first water separator 310 and a second water separator 320, for mounting between a source of ambient air and an air filter unit in a vehicle, as shown in FIG. 1. The water separating arrangement 301 is connectable to an inlet (see FIG. 1) by a first air supply conduit 303 and to an air filter unit 305 by a second air supply conduit 304. The first air supply conduit 303 is connected to an outer, first water separating section 311 of the first water separator 310 using a suitable clamping means 330, such as a hose clamp. Similarly, one end of the second air supply conduit 304 is connected to an air outlet section 329 of the water separating arrangement 301 using one clamping means 340. The other end of the second air supply conduit 304 is connected to the air filter unit 305 using a further clamping means 350.

The first water separator 310 comprises an outer, first water separating section 311 and an inner air intake section 312. The first water separating section 311 is connected to the air intake section 312, which has a free end 313 extending a predetermined distance into the first water separating section 311 in the upstream direction of the air flow F. In this example the first water separating section 311 and the air intake section 312 both comprise concentric tubular components. A water draining means 314 is provided in the lower portion of the first water separating section 311, which water draining means 314 is located adjacent and below the free end 313 of the air intake section 312.

The air intake section 312 is joined to a housing 321 that is part of the second water separator 320. The housing 321 comprises a first wall section 322 comprising an upper air inlet 323 and a second wall section 319 comprising a lower air outlet 324. In this example, the first wall section 322 and the second wall section 319 form a continuous straight wall. A curved wall 325, having a corresponding curved internal guide surface (see FIG. 3B) connects the top and bottom edges of the combined first and second wall sections 322, 319. The housing 321 is delimited by two facing side walls 326, 327 (one visible in FIG. 3A) connecting the respective side edges of the first wall section 322 with the curved wall 325 and its internal guide surface. The air flow F is directed from first air supply conduit 303 through the air intake section 312 and the upper air inlet 323 into the housing 321. The housing has a substantially D-shaped cross-section in a vertical plane coinciding with the central axis A1 of the air flow through the air intake section 312 and the central axis A2 of the air outlet section 329 where the respective axes A1, A2 join the housing 321. The first axis A1 is preferably arranged to coincide with the central axis of the air inlet 323 at the point of entry into the housing 321. The point of entry is defined as the position where the first central axis A1 intersects the first wall section 322. The second axis A2 is preferably arranged to coincide with the central axis of air outlet 324 at the point of exit out of the housing 321. The point of exit is defined as the position where the second central axis A2 intersects the second wall section 319.

The D-shaped cross-section allows the internal guide surface to redirect a part of the flow of ambient air 180° from the upper air inlet 323 towards the lower air outlet 324. A major part of the airflow will in fact be drawn from the inlet to the outlet without reaching the internal guide surface, causing water droplets to be thrown clear of the air flow as it turns. A second water separating section 328 is arranged in the lower portion of the internal guide surface (see FIG. 3B) of the housing 321 below the lower air outlet 324. The lower portion of the internal guide surface has a mainly planar cross-section in a vertical plane at right angles to the air flow through the lower air outlet 324. The second water separating section 328 comprises a transverse channel formed by the lower portion of the internal guide surface and a lower portion (see FIG. 3B; "330") of the first wall section 322. The first wall section 322 extends a predetermined distance (see FIG. 3B; "$X_2$") below the opening of the lower air outlet 324, allowing water to be collected in the transverse channel. Water is drained through a hose 316 connected to the water draining means 314 towards a lower portion of the second water separating section 328, from where it is evacuated/drained via a drainage valve (not shown) connected to a drainage hole (see FIG. 4B; "332") in the lower portion of the second water separating section. The air flow F is directed from the housing 321 through the lower air outlet 324 and into the air outlet section 329, which air outlet section 329 is arranged to supply ambient air to the air filter unit 305. In this example the air outlet section 329 comprises a tube section with a 90° bend between a horizontal inlet and a vertical outlet. Alternatively, the air outlet section can comprise a straight section, wherein the air outlet section 329 can be connected directly to the air filter using a flexible hose or similar conduit. The function of the water separating arrangement will be described in connection with FIG. 3B below.

Figure 3B:
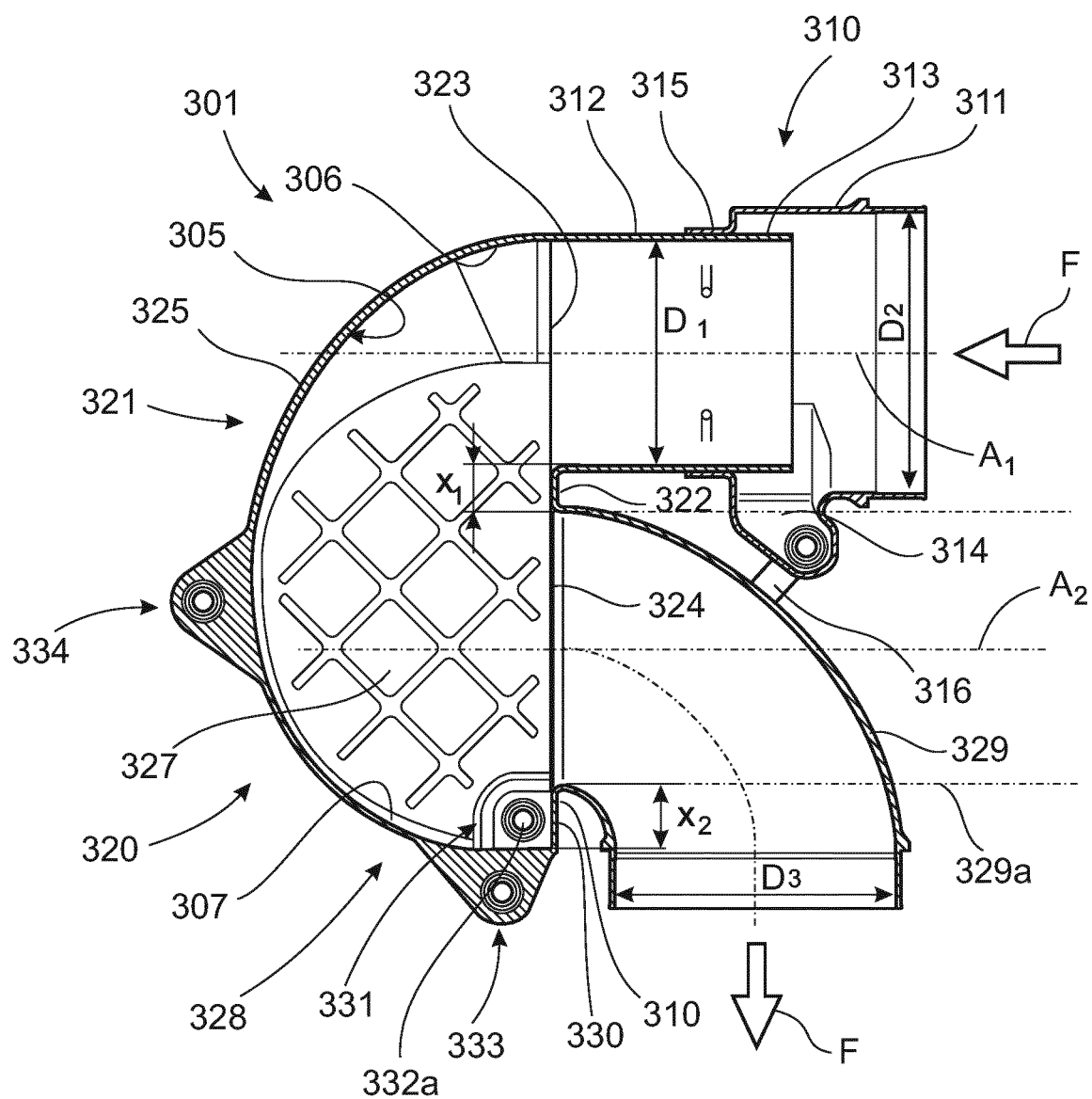
FIG. 3B shows a cross-sectional view through a water separating arrangement according to in FIG. 3A.

FIG. 3B shows a cross-sectional side view through a water separating arrangement according to the invention. The cross-section is taken in a vertical plane through the arrangement shown in FIG. 3. As in FIG. 3A, a first water separator 310 comprises an outer, first water separating section 311 and an inner air intake section 312. The first water separating section 311 is connected to the air intake section 312, which has a free end 313 extending a predetermined distance into the first water separating section 311 in the upstream direction of the air flow F. The first water separating section 311 and the air intake section 312 both comprise concentric tubular components. A water draining means 314 is provided in the lower portion of the first water separating section 311, which water draining means 314 is located adjacent and below the free end 313 of the air intake section 312. Water is drained through a hose 316 from the water draining means 314 towards a second water separating section 328, to be described below, to be removed from the arrangement.

The relative diameters D1, D2 of the free outer portions of the air intake section 312 and the first water separating section 311, respectively, are selected so that water flowing along the walls of the air supply conduit (see FIG. 3A; "303") into the first water separator 310 can flow into the first water separating section 311 without contacting the free outer portion 313 of the air intake section 312. The first water separating section 311 is permanently or detachably connected to the air intake section 312 downstream of the free outer portion 313. A connecting joint 315 prevents water from leaking past the connection, so that water reaching the water separating arrangement by following the walls of the air supply conduit will collect in the lower portion of first water separating section 311.

The air intake section 312 is joined to a housing 321 that is part of the second water separator 320. The housing 321 comprises a first wall section 322 comprising an upper air inlet 323 and a second wall section 319 comprising a lower air outlet 324. In this embodiment, the first wall section 322 and the second wall section 319 form a combined, continuous wall. A curved wall 325, having a corresponding curved internal guide surface 305, connects the top and bottom edges of the first and second wall sections 322, 319. The housing is delimited by two facing side walls 326, 327 (only "327" visible in FIG. 3) connecting the respective side edges of the first wall section 322 with the curved wall 325 and its internal guide surface 305. The air flow F is directed from first air supply conduit (see FIG. 3A; "303") through the air intake section 312 and the upper air inlet 323 into the housing 321. The housing has a substantially D-shaped cross-section in a vertical plane coinciding with the central axes A1, A2 of the air flow through the air intake section 212 and the air outlet section 229 where they join the housing 221. The D-shaped cross-section allows the internal guide surface 305 to redirect a part of the flow of ambient air over an angle α of 180° from the upper air inlet 323 towards the lower air outlet 324. A major part of the airflow will in fact be drawn from the inlet to the outlet without reaching the internal guide surface, causing water droplets to be thrown clear of the air flow as it turns. A second water separating section 328 is arranged in at a lower portion 307 of the internal guide surface 305 of the housing 321 below the lower air outlet 324. The lower portion 307 of the internal guide surface has a mainly planar cross-section in a vertical plane at right angles to the air flow through the lower air outlet 324. The second water separating section 328 comprises a draining means 331 in the form of a transverse channel or volume formed by the lower portion 307 of the internal guide surface 305 and a lower portion 330 of the first wall section 322. The first wall section 322 extends a predetermined distance $X_2$ below the opening of the lower air outlet 324, allowing water to be collected in the transverse draining means 331. Water can be removed from the water separating arrangement through a drainage hole 332 (indicated in dashed lines), which in this example is located in the lower portion 307 of the internal guide surface 305 of the housing. Alternatively, water can be removed from the water separating arrangement through a drain 332a (shown in dashed lines), which in this example is located in the side wall 326. The air flow F is directed from the housing 321 through the lower air outlet 324 and into the air outlet section 329, which air outlet section 329 is arranged to supply ambient air to the air filter unit (see FIG. 3A; "305"). In this example the air outlet section 329 comprises a tube section with a 90° bend between a horizontal inlet and a vertical outlet. Alternatively, the air outlet section can comprise a straight section. The air outlet section 329 having a diameter $D_3$ can be connected directly to the air filter using a flexible hose or similar conduit. The air outlet section 329 diameter $D_3$ is equal to or greater than the diameter $D_1$ of the air intake section 312. The water separating arrangement 301 is attached to the vehicle at a number of attachment points 333, 334 (two shown).

In operation, the air flow from the inlet will enter the first water separator 310, wherein water flowing along the walls of the air supply conduit into the first water separator 310 can be removed. The air flow from the first water separator 310 will enter the second water separator 320 through the horizontal upper air inlet 323 of the housing 321. Water spray carried by the flow of ambient air will impinge on and adhere to the internal guide surface 305 and, to a certain extent to the facing side walls 326, 327. Deposited water droplets will flow downwards along the walls of the housing 321 towards the draining means 331. An advantage of this arrangement is that the redirection of the air flow will cause the relatively heavier water droplets carried by the air flow to be thrown outwards by the centrifugal force and impinge on the internal guide surface 305.

In the embodiment of FIGS. 3A and 3B, the distance between the side wall sections 326, 327 adjacent the air inlet is at least equal to the inner diameter D1 of the air inlet 323. The cross-sectional shape of an upper portion 306 of the internal guide surface 305, adjacent the air intake section 312, conforms with the arcuate cross-sectional shape of a corresponding portion of the air intake section 312 in a vertical plane through the air intake section 312 at right angles to the air flow F. The respective upper portions of the air intake section 312 and the upper air inlet 323 leading into the housing 321 have corresponding cross-sectional shapes in order to provide a smooth transition for minimizing the flow resistance. However, the distance between the side wall sections 326, 327 adjacent the air outlet is greater than the inner diameter D3 of the air outlet 324. A lower portion 307 of the internal guide surface 305 has a mainly planar cross-section in a vertical plane at right angles to the air flow. The horizontal extension of the planar cross-section can be substantially up to the distance between the facing side walls 326, 327. This arrangement provides an edge, or barrier, between the side walls and the second wall section in order to prevent water adhering to the side wall sections from being drawn into the air outlet. In addition, the cross-sectional shape of the internal guide surface 305 changes gradually from a curved or part circular shape at its upper end 306 to a planar shape at its lower end 307 along the curved extension of the internal guide surface 305. An advantage of this cross-sectional shape is that the increasing cross-sectional flow area causes the air flow to slow down marginally, which will contribute to the release of water droplets from the air flow. A further advantage is that the changing cross-sectional area of the internal guide surface in the direction of the outlet will induce turbulence in the air flow at the same time as the available area for impinging water droplets is increased.

The subsequent FIGS. 4A-4B, 5A-5D, 6A-6B and 7A-7B show a number of non-limiting examples of possible configurations for the second water separating section, as it is not practical to illustrate all the possible variants and combinations of the claimed invention. Each example would be provided with a first water separating section at its inlet as described in the above text. The numbering used in FIGS. 2A-2B and 3A-3B will be retained in these figures. Also, the angle over which the air flow is being redirected is designated "α" throughout. Similarly, the air flow from a source of ambient air is designated F in the direction described in the text and F' in the opposite direction.

FIGS. 4A-4D show examples of possible configurations for a second water separating section wherein a housing is provided with an air inlet and an air outlet with their respective first and second wall sections arranged at various angles.

Figure 4A:
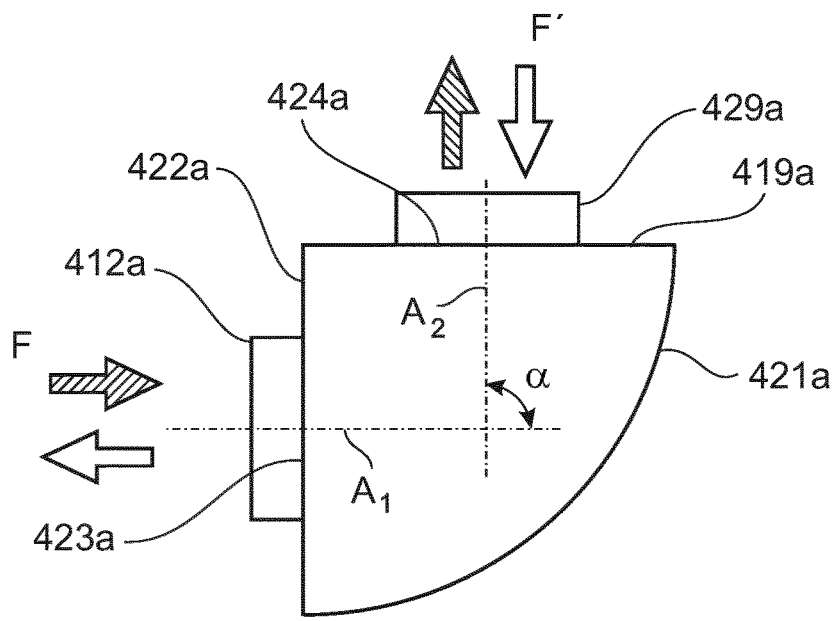
FIG. 4A-D show examples of second water separating sections with their respective first and second wall sections arranged at various angles.

In FIG. 4A the air flow F (filled arrow) is directed through an air intake section 412a into an air inlet 423a into a housing 421a. The housing has a substantially D-shaped cross-section in a vertical plane coinciding with the central axis A1 of the air flow through the air intake section 412a and the central axis A2 of an air outlet section 429a where the respective axes A1, A2 join the housing 421a. The first axis A1 is preferably arranged to coincide with the central axis of the air inlet 423a at the point of entry into the housing 421a. The point of entry is defined as the position where the first central axis A1 intersects the first wall section 422a. The second axis A2 is preferably arranged to coincide with the central axis of air outlet 424a at the point of exit out of the housing 421a. The point of exit is defined as the position where the second central axis A2 intersects the second wall section 419a.

In FIG. 4A, the first central axis A1 enters the housing at right angles to the first wall section 422a and the second central axis A2 exits the housing at right angles to the second wall section 419a. In addition, the first wall section 422a is arranged at right angles to the second wall section 419a. As a result, the axes A1 and A2 are arranged at right angles to each other and the air flow is redirected over an angle α of 90°, in the same way as shown in FIGS. 3A-3B. According to the invention, this angle may be reduced down to 80°. By a suitable adaptation of the housing, the air inlet and the air outlet, the air flow can also be supplied in the opposite direction F' (outlined arrows).

Figure 4B:
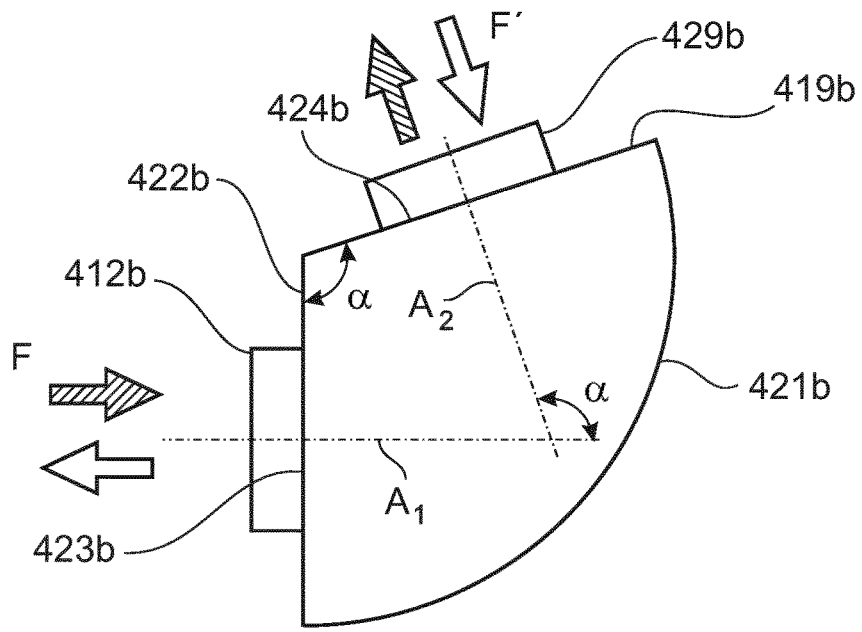

In FIG. 4B the air flow F (filled arrow) is directed through an air intake section 412b into an air inlet 423b into a housing 421b. The housing has a substantially D-shaped cross-section in a vertical plane coinciding with the central axis A1 of the air flow through the air intake section 412b and the central axis A2 of an air outlet section 429b where the respective axes A1, A2 join the housing 421b. The first axis A1 is preferably arranged to coincide with the central axis of the air inlet 423b at the point of entry into the housing 421b. The point of entry is defined as the position where the first central axis A1 intersects the first wall section 422b. The second axis A2 is preferably arranged to coincide with the central axis of air outlet 424b at the point of exit out of the housing 421b. The point of exit is defined as the position where the second central axis A2 intersects the second wall section 419b.

In FIG. 4B, the first central axis A1 enters the housing at right angles to the first wall section 422b and the second central axis A2 exits the housing at right angles to the second wall section 419b. In addition, the first wall section 422b is arranged at an angle α relative to the second wall section 419b. As a result, the axes A1 and A2 are arranged at the same angle relative to each other and the air flow is redirected over an angle α. In this example, this angle may be selected within the range 80° to 200°. By a suitable adaptation of the housing, the air inlet and the air outlet, the air flow can also be supplied in the opposite direction F' (outlined arrows).

Figure 4C:
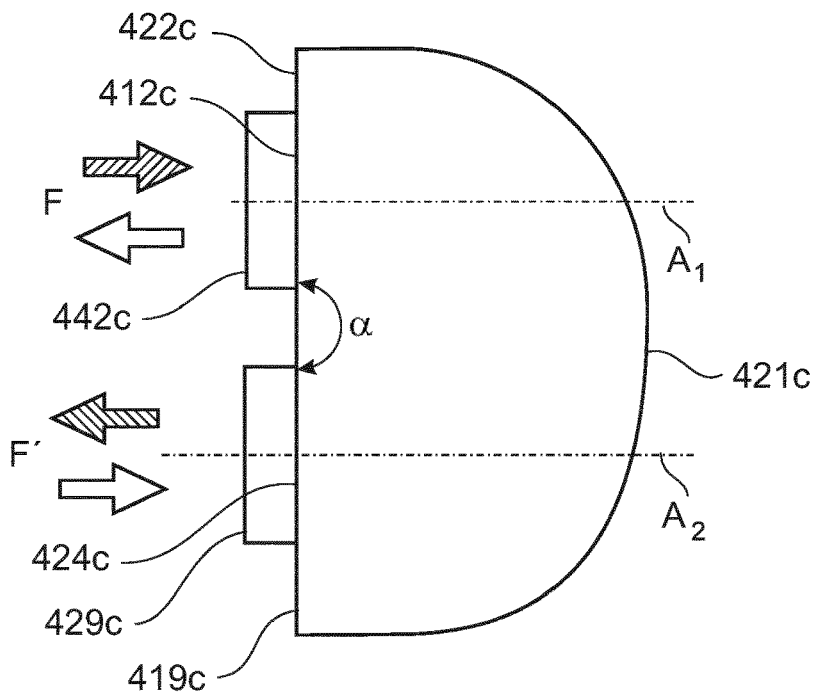

In FIG. 4C the air flow F (filled arrow) is directed through an air intake section 412c into an air inlet 423c into a housing 421c. The housing has a substantially D-shaped cross-section in a vertical plane coinciding with the central axis A1 of the air flow through the air intake section 412c and the central axis A2 of an air outlet section 429c where the respective axes A1, A2 join the housing 421c. The first axis A1 is preferably arranged to coincide with the central axis of the air inlet 423c at the point of entry into the housing 421c. The point of entry is defined as the position where the first central axis A1 intersects the first wall section 422c. The second axis A2 is preferably arranged to coincide with the central axis of air outlet 424c at the point of exit out of the housing 421c. The point of exit is defined as the position where the second central axis A2 intersects the second wall section 419c.

In FIG. 4C, the first central axis A1 enters the housing at right angles to the first wall section 422c and the second central axis A2 exits the housing at right angles to the second wall section 419c. In addition, the first wall section 422c and the second wall section 419c are arranged in a common plane at an angle α of 180° to each other, relative to an axis through the joint between the said walls. As a result, the axes A1 and A2 are arranged in parallel and the air flow is redirected over an angle of 180°. By a suitable adaptation of the housing, the air inlet and the air outlet, the air flow can also be supplied in the opposite direction F' (outlined arrows).

Figure 4D:
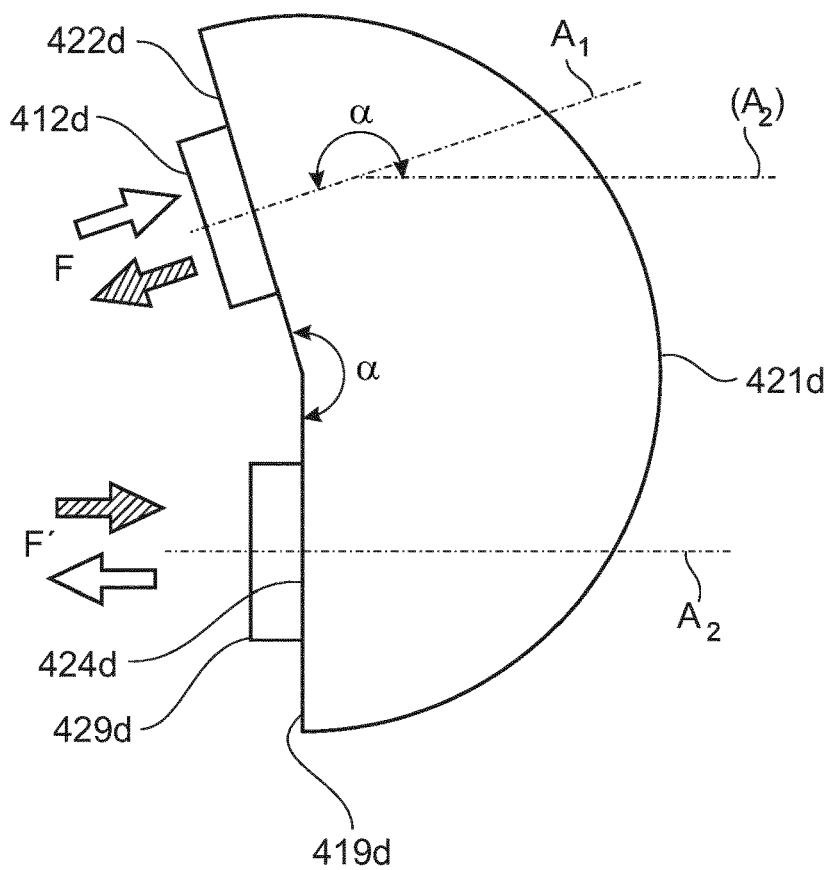

In FIG. 4D the air flow F (filled arrow) is directed through an air intake section 412b into an air inlet 423b into a housing 421d. The housing has a substantially D-shaped cross-section in a vertical plane coinciding with the central axis A1 of the air flow through the air intake section 412d and the central axis A2 of an air outlet section 429d where the respective axes A1, A2 join the housing 421d. The first axis A1 is preferably arranged to coincide with the central axis of the air inlet 423d at the point of entry into the housing 421d. The point of entry is defined as the position where the first central axis A1 intersects the first wall section 422d. The second axis A2 is preferably arranged to coincide with the central axis of air outlet 424d at the point of exit out of the housing 421d. The point of exit is defined as the position where the second central axis A2 intersects the second wall section 419d.

In FIG. 4D, the first central axis A1 enters the housing at right angles to the first wall section 422d and the second central axis A2 exits the housing at right angles to the second wall section 419d. In addition, the first wall section 422d is arranged at an angle α to the second wall section 419d. As a result, the axes A1 and A2 are arranged at the same angle relative to each other and the air flow is redirected over an angle α. In this example, this angle is over 180° and may be selected up to 200°. By a suitable adaptation of the housing, the air inlet and the air outlet, the air flow can also be supplied in the opposite direction F' (outlined arrows).

FIGS. 5A-5D show examples of possible configurations for a second water separating section wherein a housing is provided with an air inlet and an air outlet arranged at various angles.

Figure 5A:
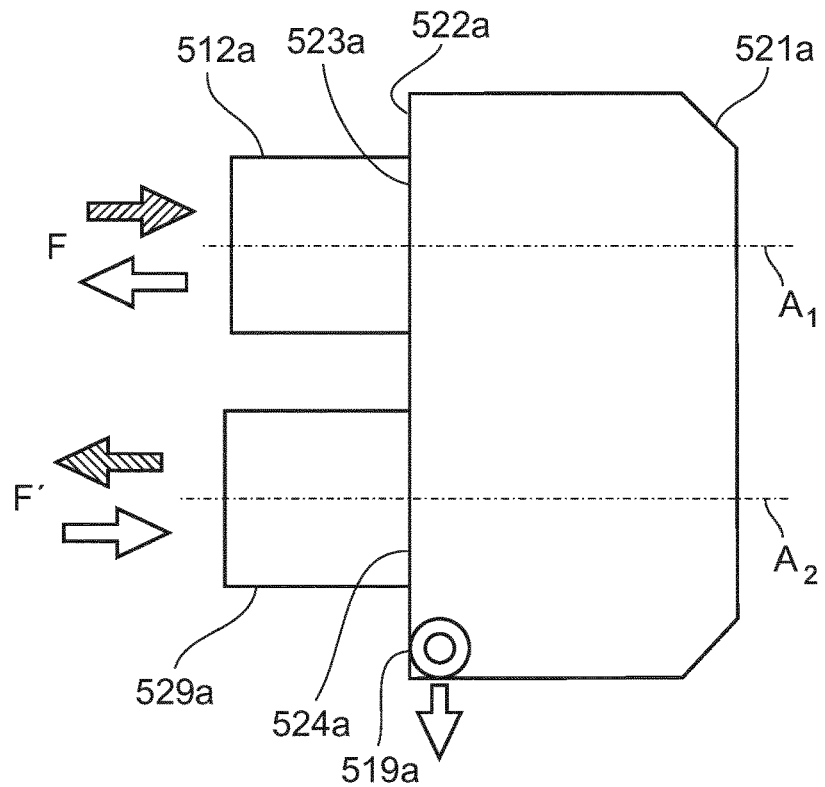
FIG. 5A-D show examples of second water separating sections with their respective air inlet and air outlet arranged at various angles.

In FIG. 5A the air flow F (filled arrow) is directed through an air intake section 512a into an air inlet 523a into a housing 521a. The housing has a substantially D-shaped cross-section in a vertical plane coinciding with the central axis A1 of the air flow through the air intake section 512a and the central axis A2 of an air outlet section 529a where the respective axes A1, A2 join the housing 521a. The first axis A1 is preferably arranged to coincide with the central axis of the air inlet 523a at the point of entry into the housing 521a. The point of entry is defined as the position where the first central axis A1 intersects the first wall section 522a. The second axis A2 is preferably arranged to coincide with the central axis of air outlet 524a at the point of exit out of the housing 521a. The point of exit is defined as the position where the second central axis A2 intersects the second wall section 519a.

In FIG. 5A, the first central axis A1 enters the housing at right angles to the first wall section 522a and the second central axis A2 exits the housing at right angles to the second wall section 519a. As a result, the axes A1 and A2 are parallel and the air flow is redirected over an angle of 180°, in the same way as shown in FIGS. 3A-3B. The FIG. 5 schematically indicates the main flow of air through the housing and the direction of water droplets ejected from the air flow. By a suitable adaptation of the housing, the air inlet and the air outlet, the air flow can also be supplied in the opposite direction F' (outlined arrows).

Figure 5B:
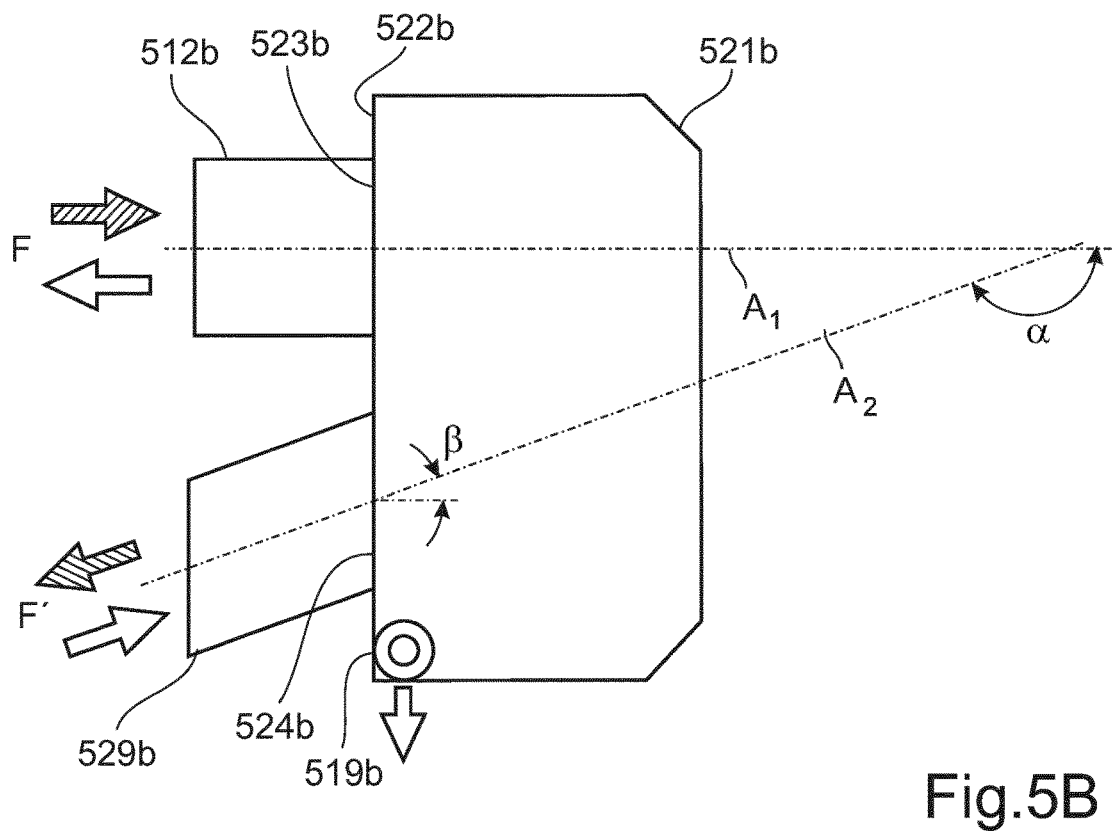

In FIG. 5B the air flow F (filled arrow) is directed through an air intake section 512b into an air inlet 523b into a housing 521b. The housing has a substantially D-shaped cross-section in a vertical plane coinciding with the central axis A1 of the air flow through the air intake section 512b and the central axis A2 of an air outlet section 529b where the respective axes A1, A2 join the housing 521b. The first axis A1 is preferably arranged to coincide with the central axis of the air inlet 523b at the point of entry into the housing 521b. The point of entry is defined as the position where the first central axis A1 intersects the first wall section 522b. The second axis A2 is preferably arranged to coincide with the central axis of air outlet 524b at the point of exit out of the housing 521b. The point of exit is defined as the position where the second central axis A2 intersects the second wall section 519b.

In FIG. 5B, the first central axis A1 enters the housing at right angles to the first wall section 522b and the second central axis A2 exits the housing at an angle β to the normal of the second wall section 519b and diverging from the first axis A1. As a result, the axes A1 and A2 are arranged at an angle α relative to each other and the air flow is redirected over an angle of 180° minus the angle β. By a suitable adaptation of the housing, the air inlet and the air outlet, the air flow can also be supplied in the opposite direction F' (outlined arrows).

Figure 5C:
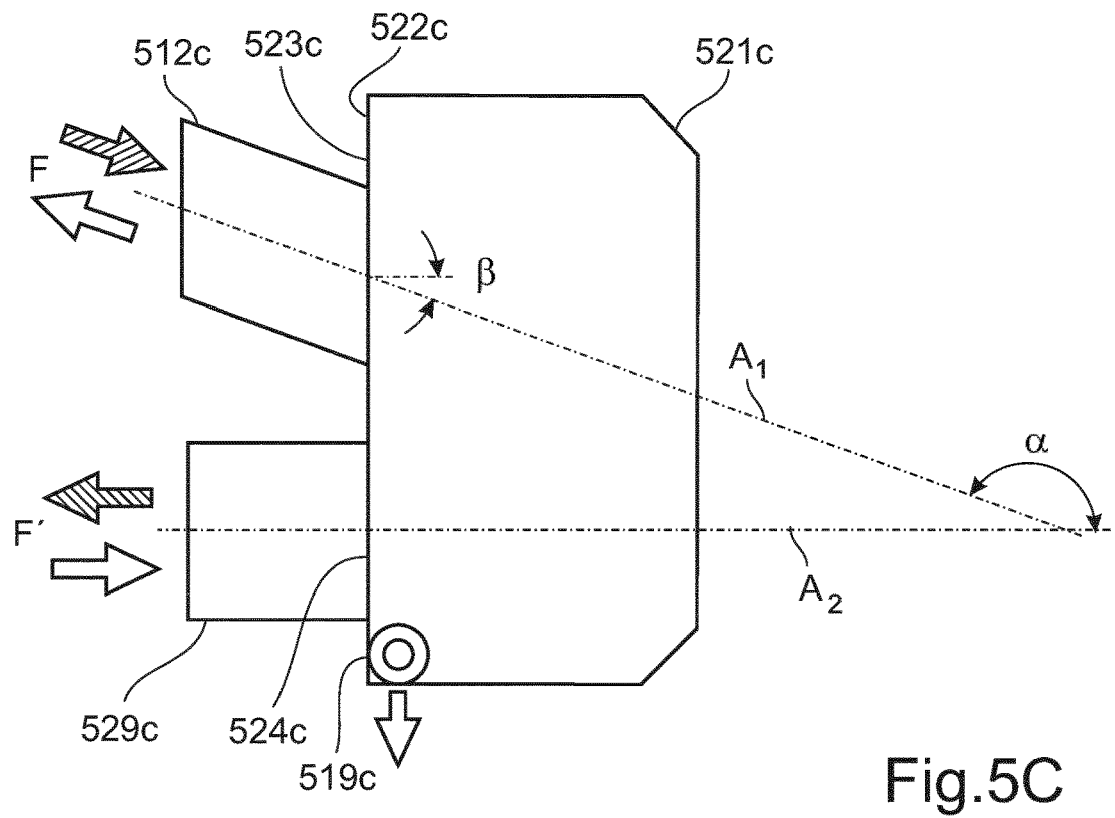

In FIG. 5C the air flow F (filled arrow) is directed through an air intake section 512c into an air inlet 523c into a housing 521c. The housing has a substantially D-shaped cross-section in a vertical plane coinciding with the central axis A1 of the air flow through the air intake section 512c and the central axis A2 of an air outlet section 529c where the respective axes A1, A2 join the housing 521c. The first axis A1 is preferably arranged to coincide with the central axis of the air inlet 523c at the point of entry into the housing 521c. The point of entry is defined as the position where the first central axis A1 intersects the first wall section 522c. The second axis A2 is preferably arranged to coincide with the central axis of air outlet 524c at the point of exit out of the housing 521c. The point of exit is defined as the position where the second central axis A2 intersects the second wall section 519c.

In FIG. 5C, the first central axis A1 enters the housing at an angle β to the normal of the first wall section 522c and converging with the second central axis A2. The second central axis A2 exits the housing at right angles to the second wall section 519c. As a result, the axes A1 and A2 are arranged at an angle α relative to each other and the air flow is redirected over an angle of 180° minus the angle β. By a suitable adaptation of the housing, the air inlet and the air outlet, the air flow can also be supplied in the opposite direction F' (outlined arrows).

Figure 5D:
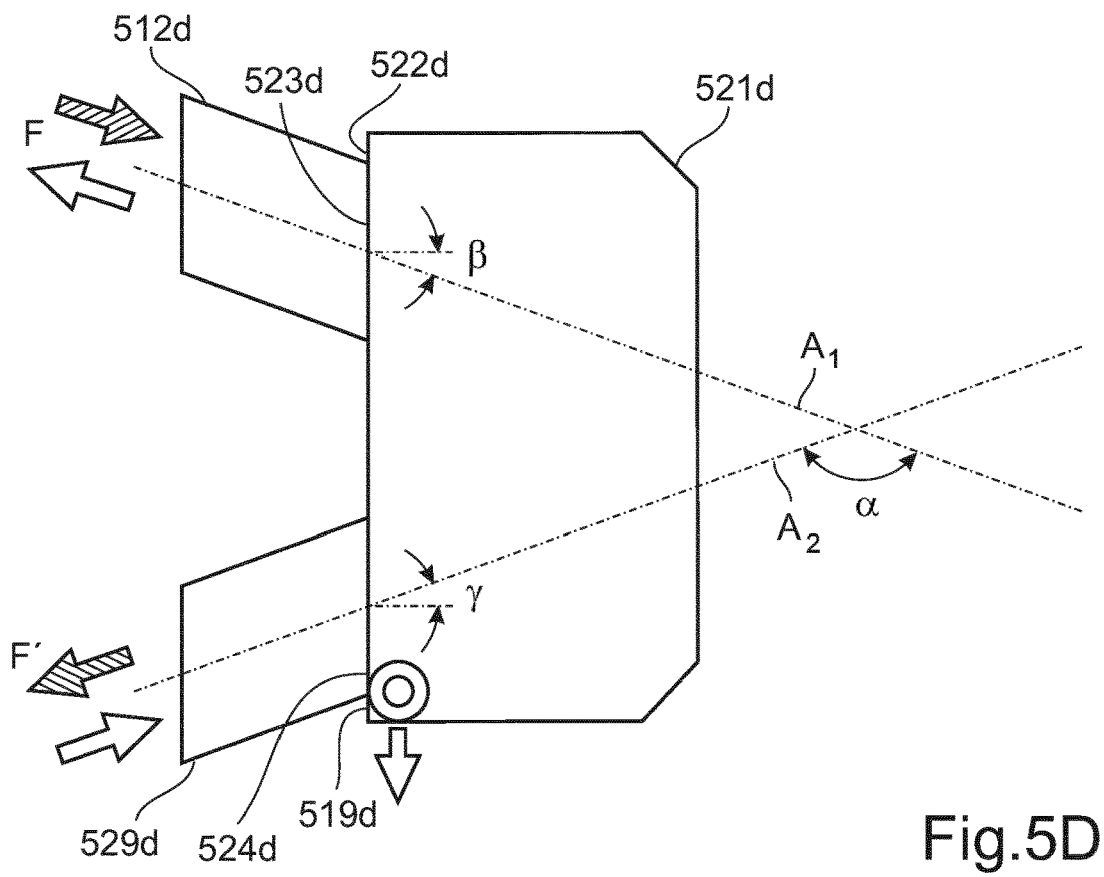

In FIG. 5D the air flow F (filled arrow) is directed through an air intake section 512d into an air inlet 523d into a housing 521d. The housing has a substantially D-shaped cross-section in a vertical plane coinciding with the central axis A1 of the air flow through the air intake section 512d and the central axis A2 of an air outlet section 529d where the respective axes A1, A2 join the housing 521d. The first axis A1 is preferably arranged to coincide with the central axis of the air inlet 523d at the point of entry into the housing

521*d*. The point of entry is defined as the position where the first central axis A1 intersects the first wall section 522*d*. The second axis A2 is preferably arranged to coincide with the central axis of air outlet 524*d* at the point of exit out of the housing 521*d*. The point of exit is defined as the position where the second central axis A2 intersects the second wall section 519*d*.

In FIG. 5D, the first central axis A1 enters the housing at an angle β to the normal of the first wall section 522*d* and converging with the second central axis A2. The second central axis A2 exits the housing at an angle γ to the normal of the second wall section 519*d* and diverging from the first central axis A1. As a result, the axes A1 and A2 are arranged at an angle α relative to each other and the air flow is redirected over an angle of 180° minus the sum of the angles β and γ. By a suitable adaptation of the housing, the air inlet and the air outlet, the air flow can also be supplied in the opposite direction F' (outlined arrows).

Figure 6A:
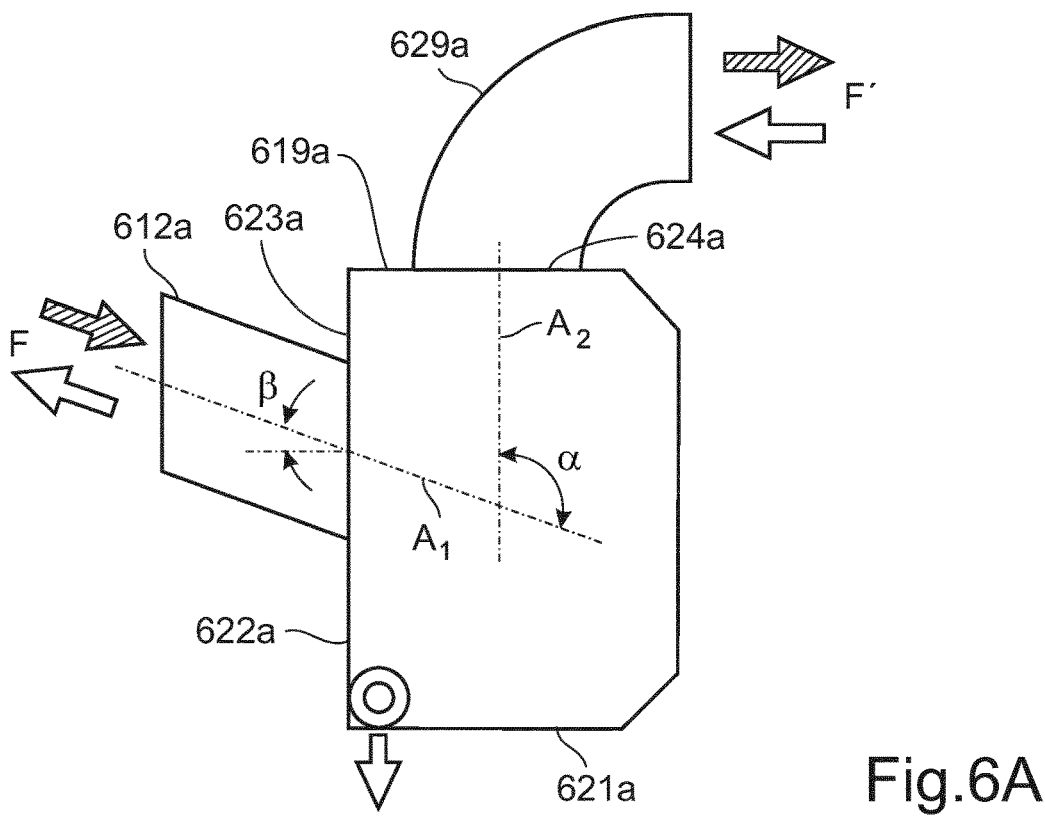
FIG. 6A-B show examples of second water separating sections with combinations of angled wall sections and angled air inlets, air outlets.
Figure 6B:
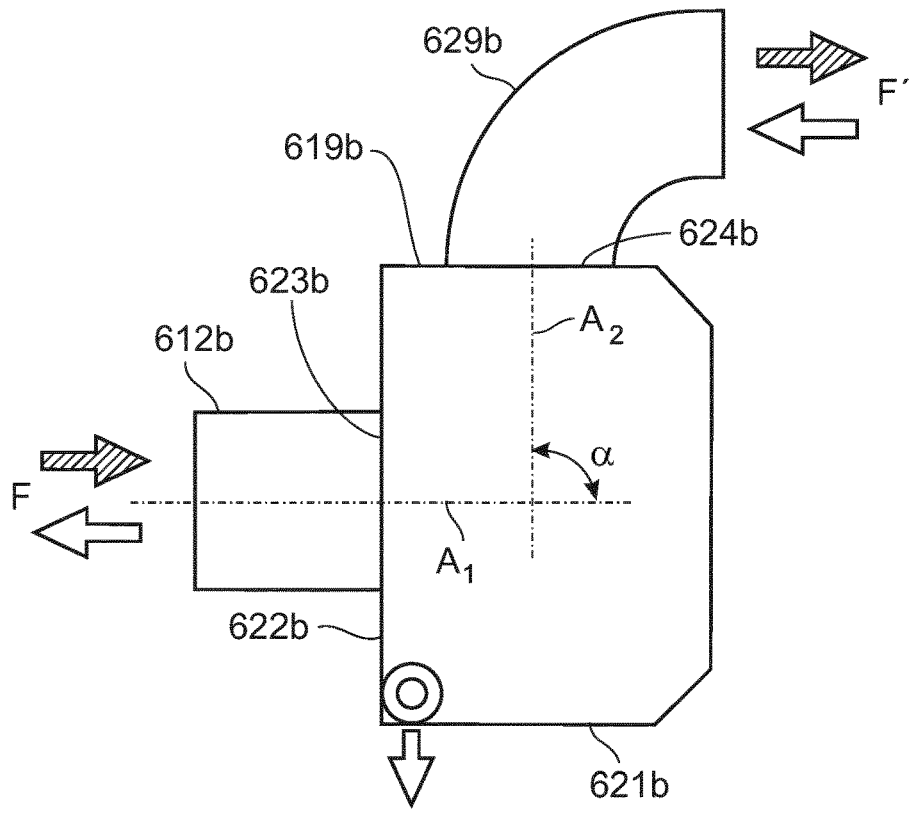

FIGS. 6A-6B show examples of possible configurations for a second water separating section with a housing wherein either of an air inlet and an air outlet with their respective first and second wall sections can be arranged at various angles.

In FIG. 6A the air flow F (filled arrow) is directed through an air intake section 612*a* into an air inlet 623*a* into a housing 621*a*. The housing has a substantially D-shaped cross-section in a vertical plane coinciding with the central axis A1 of the air flow through the air intake section 612*a* and the central axis A2 of a curved air outlet section 629*a* where the respective axes A1, A2 join the housing 621*a*. The first axis A1 is preferably arranged to coincide with the central axis of the air inlet 623*a* at the point of entry into the housing 621*a*. The point of entry is defined as the position where the first central axis A1 intersects the first wall section 622*a*. The second axis A2 is preferably arranged to coincide with the central axis of air outlet 624*a* at the point of exit out of the housing 621*a*. The point of exit is defined as the position where the second central axis A2 intersects the second wall section 619*a*.

In FIG. 6A, the first central axis A1 enters the housing at an angle β to the normal of the first wall section 622*a* and away from the air outlet 624*a* in the second wall section 619*a*. The second central axis A2 exits the housing at right angles to the second wall section 619*a*. In addition, the first wall section 622*a* is arranged at right angles to the second wall section 619*a*. As a result, the axes A1 and A2 are arranged at an angle α relative to each other and the air flow is redirected over an angle of 90° plus the angle β, in the same way as shown in FIGS. 2A-2B. In this example, it is preferable that the angle β is not increased to the extent that the air flow reaches the lower portion of the housing 621*a*. The figure schematically indicates the main flow of air through the housing and the direction of water droplets ejected from the air flow. By a suitable adaptation of the housing, the air inlet and the air outlet, the air flow can also be supplied in the opposite direction F' (outlined arrows).

In FIG. 6B the air flow F (filled arrow) is directed through an air intake section 612*b* into an air inlet 623*b* into a housing 621*b*. The housing has a substantially D-shaped cross-section in a vertical plane coinciding with the central axis A1 of the air flow through the air intake section 612*b* and the central axis A2 of a curved air outlet section 629*b* where the respective axes A1, A2 join the housing 621*b*. The first axis A1 is preferably arranged to coincide with the central axis of the air inlet 623*b* at the point of entry into the housing 621*b*. The point of entry is defined as the position where the first central axis A1 intersects the first wall section 622*b*. The second axis A2 is preferably arranged to coincide with the central axis of air outlet 624*b* at the point of exit out of the housing 621*b*. The point of exit is defined as the position where the second central axis A2 intersects the second wall section 619*b*.

In FIG. 6B, the first central axis A1 enters the housing at right angles to the first wall section 622*b* and the second central axis A2 exits the housing at right angles to the second wall section 619*b*. In addition, the first wall section 622*b* is arranged at right angles to the second wall section 619*b*. As a result, the axes A1 and A2 are arranged at right angles to relative to each other and the air flow is redirected over an angle of 90°. By a suitable adaptation of the housing, the air inlet and the air outlet, the air flow can also be supplied in the opposite direction F' (outlined arrows).

Figure 7A:
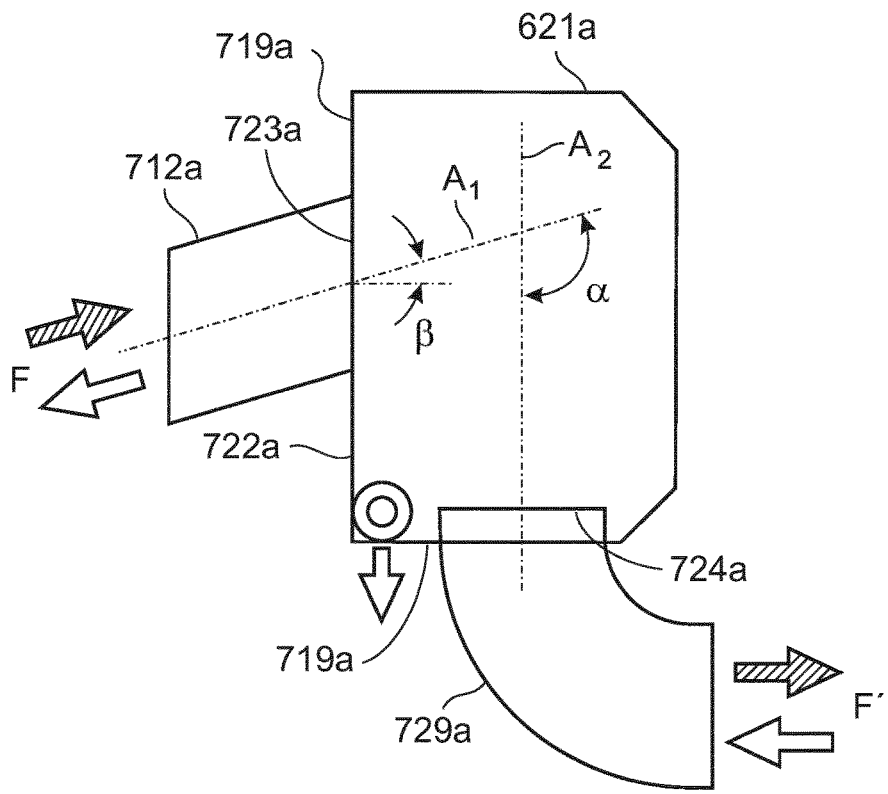
FIG. 7A-B show examples of second water separating sections with combinations of angled wall sections and lower angled air inlets or air outlets.
Figure 7B:
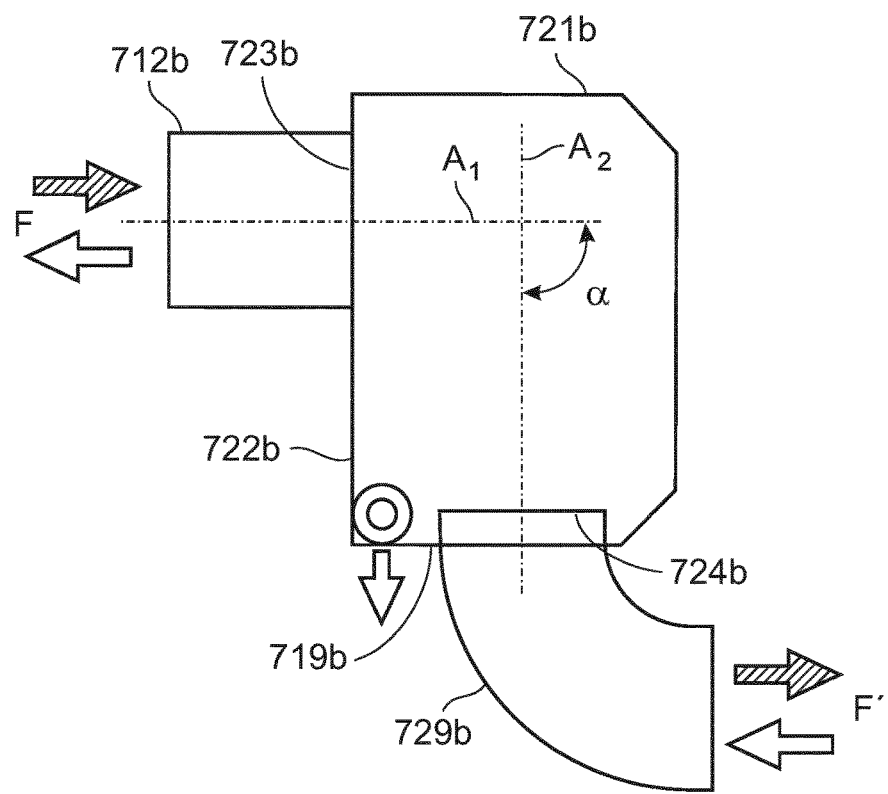

FIGS. 7A-7B show examples of possible configurations for a second water separating section with a housing wherein either of an air inlet and an air outlet with their respective first and second wall sections can be arranged at various angles, as well as in a lower portion of the housing.

In FIG. 7A the air flow F (filled arrow) is directed through an air intake section 712*a* into an air inlet 723*a* into a housing 721*a*. The housing has a substantially D-shaped cross-section in a vertical plane coinciding with the central axis A1 of the air flow through the air intake section 712*a* and the central axis A2 of a curved air outlet section 729*a* where the respective axes A1, A2 join the housing 721*a*. The first axis A1 is preferably arranged to coincide with the central axis of the air inlet 723*a* at the point of entry into the housing 721*a*. The point of entry is defined as the position where the first central axis A1 intersects the first wall section 722*a*. The second axis A2 is preferably arranged to coincide with the central axis of air outlet 724*a* at the point of exit out of the housing 721*a*. The point of exit is defined as the position where the second central axis A2 intersects the second wall section 719*a*. The curved air outlet section 729*a* is located with its air outlet 724*a* positioned a predetermined distance above a lower surface of the housing 721*a*, in order to allow water to be collected and drained from the housing 721*a*.

In FIG. 7A, the first central axis A1 enters the housing at an angle β to the normal of the first wall section 722*a* and away from the air outlet 724*a* in the second wall section 719*a*.

The second central axis A2 exits the housing at right angles to the second wall section 719*a*. In addition, the first wall section 722*a* is arranged at right angles to the second wall section 719*a*. As a result, the axes A1 and A2 are arranged at an angle α relative to each other and the air flow is redirected over an angle of 90° plus the angle α. The FIG. 5 schematically indicates the main flow of air through the housing and the direction of water droplets ejected from the air flow. By a suitable adaptation of the housing, the air inlet and the air outlet, the air flow can also be supplied in the opposite direction F' (outlined arrows).

In FIG. 7B the air flow F (filled arrow) is directed through an air intake section 712*b* into an air inlet 723*b* into a housing 721*b*. The housing has a substantially D-shaped cross-section in a vertical plane coinciding with the central axis A1 of the air flow through the air intake section 712*b* and the central axis A2 of a curved air outlet section 729*b* where the respective axes A1, A2 join the housing 721*b*. The first axis A1 is preferably arranged to coincide with the central axis of the air inlet 723*b* at the point of entry into the housing 721*b*. The point of entry is defined as the position where the first central axis A1 intersects the first wall section 722*b*. The second axis A2 is preferably arranged to coincide with the central axis of air outlet 724*b* at the point of exit out of the housing 721*b*. The point of exit is defined as the position where the second central axis A2 intersects the second wall section 719*b*. The curved air outlet section 729*b* is located with its air outlet 724*b* positioned a predetermined distance above a lower surface of the housing 721*b*, in order to allow water to be collected and drained from the housing 721*b*.

In FIG. 7B, the first central axis A1 enters the housing at right angles to the first wall section 722*b* and the second central axis A2 exits the housing at right angles to the second wall section 719*b*. In addition, the first wall section 722*b* is arranged at right angles to the second wall section 719*b*. As a result, the axes A1 and A2 are arranged at right angles to relative to each other and the air flow is redirected over an angle of 90°. By a suitable adaptation of the housing, the air inlet and the air outlet, the air flow can also be supplied in the opposite direction F' (outlined arrows).

Figure 8A:
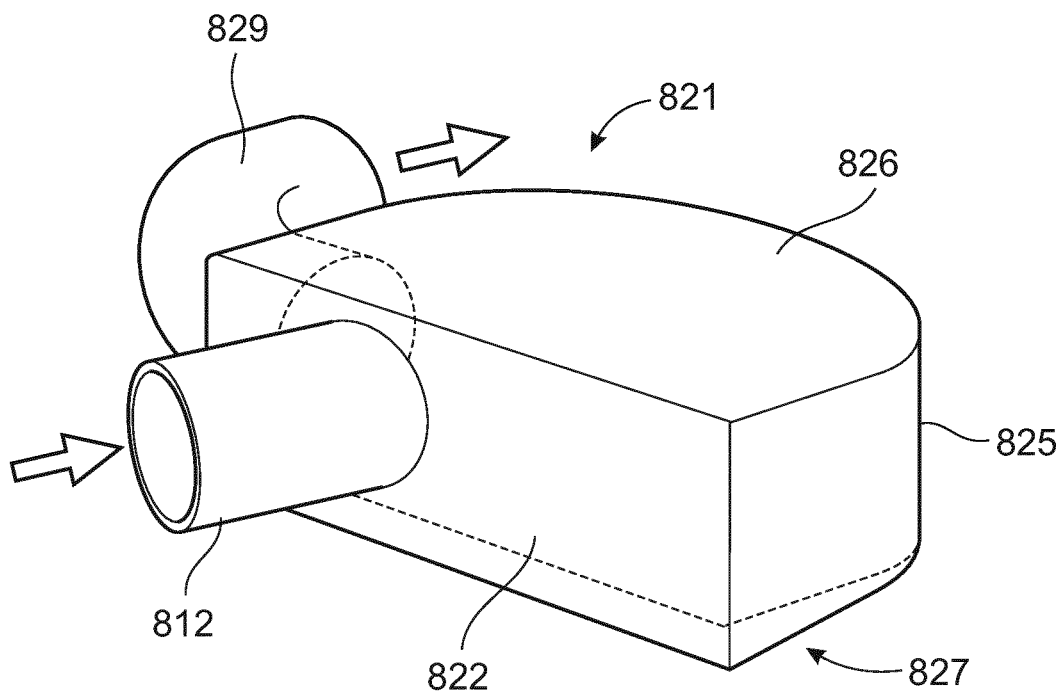
FIG. 8A-B show an example of a second water separating section with an air inlet and an air outlet located in a horizontal plane.
Figure 8B:
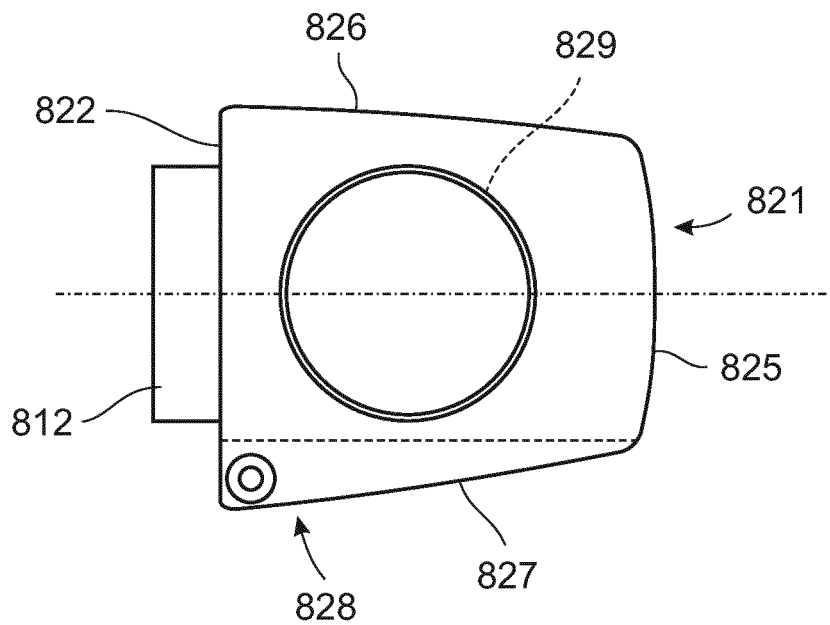

FIGS. 8A and 8B show an example of a possible configuration for a second water separating section with a housing comprising an air inlet and an air outlet located in a horizontal plane. The examples listed above in FIGS. 4-7, relating to possible angles of wall sections, inlets and outlets are also applicable to the example in FIGS. 8A-8B.

FIG. 8A shows a perspective view of a second water separating section with an air intake section 812 and an air outlet section 829 joined to a housing 821. The housing 821 comprises a first wall section 822 comprising the air inlet 823 and a second wall section 819 comprising an air outlet 824. In this example, the first wall section 822 and the second wall section 819 are arranged at right angles to each other, as shown in FIG. 6B. A curved wall 825, having a corresponding curved internal guide surface connects the remote edges of the joined first and second wall sections 822, 819. The housing 821 is delimited by two facing side walls 826, 827 connecting the respective side edges of the first and second wall sections 822, 819 with the curved wall 825. The air flow F is directed through the air intake section 812 and the air inlet 823 into the housing 821. The housing has a substantially D-shaped cross-section as described in connection with FIG. 6A.

The D-shaped cross-section allows the internal guide surface to redirect a part of the flow of ambient air from the air inlet 823 towards the air outlet 824. A major part of the airflow will be drawn from the inlet to the outlet without reaching the internal guide surface, causing water droplets to be thrown clear of the air flow as it turns. FIG. 8B shows a side view of the second water separating section in FIG. 8A. A second water separating section 828 is arranged in the lower portion of the housing 821 a predetermined distance below the lower periphery of both the air inlet 823 and the air outlet 824. The lower portion of the housing 821 is formed by the lower side wall section 827, which is angled downwards towards the first wall section 822. The second water separating section 828 comprises a transverse channel formed by the lower portions of the side wall section 827 and the first wall section 822.

It is to be understood that the present invention is not limited to the embodiments described above and illustrated in the drawings; rather, the skilled person will recognize that many changes and modifications may be made within the scope of the appended claims. All the above embodiments and examples may, if suitable, be combined within the scope of the claims.

The invention claimed is:

1. A water separating arrangement in a vehicle engine air intake mounted between a source of air and an engine air filter unit, the water separating arrangement comprises:
   an air intake section configured to receive a flow of air;
   a first water separating section configured to surround at least the lower half of a closed circumference of an outer portion of the air intake section;
   an air outlet section arranged separated from the air intake section to supply air to the air filter unit;
   a first water drain provided in the lower portion of the first water separating section, the first water drain located adjacent and below the free end of the air intake section; and
   a second water separating section located between the air intake section and the air outlet section, the second water separating section comprises a housing having:
      a first wall section with an air inlet connected to the air intake section and directing the air flow into the housing along a first axis; and
      a second wall section with an air outlet connected to the air outlet section and directing the air flow out of the housing along a second axis;
      wherein the second water separating section has a water collecting portion arranged in a lower part of the housing, a predetermined vertical distance below the air inlet and/or the air outlet;
   wherein the first wall section and the second wall section are connected along a common line; and
   wherein the first axis and the second axis are located angled relative to each other to re-direct the air flow direction from the air inlet and towards the air outlet over an angle of at least 80°.

2. The water separating arrangement of claim 1, wherein the first water separating section is arranged to surround up to and including the entire closed circumference of an outer portion of the air intake section.

3. The water separating arrangement of claim 1, wherein:
   a free outer portion of the air intake section extends upstream a predetermined distance into the first water separating section; and
   the first water separating section is connected to the air intake section downstream of the free outer portion.

4. The water separating arrangement of claim 1, wherein the first axis and the second axis are located angled to re-direct the air flow direction between the air inlet and the air outlet in order to remove water from the air flow by centrifugal force.

5. The water separating arrangement of claim 1, wherein the first wall section is arranged at an angle relative to the second wall section the angle is selected in the range from 80° to 200°.

6. The water separating arrangement of claim 5, wherein each of the first axis and the second axis are located at right angles to a plane coinciding with a respective first wall section and second wall section.

7. The water separating arrangement of claim 5, wherein one or both of the first axis and the second axis are located at an angle to a plane coinciding with their respective first wall section and second wall section.

8. The water separating arrangement of claim 1, wherein the air inlet is connected to the housing at a location above the air outlet.

9. The water separating arrangement of claim 1, wherein the air outlet is connected to the housing at a location above the air inlet.

10. The water separating arrangement of claim 1, wherein the air outlet and the air inlet are connected to the housing at the same horizontal level.

11. The water separating arrangement of claim 1, wherein the housing further comprises a curved surface facing the air inlet and the air outlet and connecting the first wall section and the second wall section.

12. The water separating arrangement of claim 1, wherein the air intake section comprises a curved conduit upstream of the first water separating section.

13. The water separating arrangement of claim 1, wherein the air outlet section comprises a curved conduit downstream of the air outlet.

14. A vehicle comprising a water separating arrangement in a vehicle engine air intake mounted between a source of air and an engine air filter unit, wherein the water separating arrangement comprises:
   an air intake section arranged to receive a flow of air;
   a first water separating section arranged to surround at least the lower half of a closed circumference of an outer portion of the air intake section;
   an air outlet section separated from the air intake section to supply air to the air filter unit;
   a first water drain provided in the lower portion of the first water separating section, the first water drain located adjacent and below the free end of the air intake section; and
   a second water separating section located between the air intake section and the air outlet section, the second water separating section comprises a housing having:
      a first wall section with an air inlet connected to the air intake section and directing the air flow into the housing along a first axis; and
      a second wall section with an air outlet connected to the air outlet section and directing the air flow out of the housing along a second axis;
      wherein the second water separating section has a water collecting portion arranged in a lower part of the housing, a predetermined vertical distance below the air inlet and/or the air outlet;
      wherein the first wall section and the second wall section are connected along a common line; and
      wherein the first axis and the second axis are located angled relative to each other to re-direct the air flow direction from the air inlet and towards the air outlet over an angle of at least 80°.

* * * * *